US012620164B2

(12) United States Patent
Gosala et al.

(10) Patent No.: US 12,620,164 B2
(45) Date of Patent: May 5, 2026

(54) USING NEURAL RADIANCE FIELDS FOR LABEL EFFICIENT IMAGE PROCESSING

(71) Applicant: QUALCOMM Technologies, Inc., San Diego, CA (US)

(72) Inventors: Nikhil Gosala, Freiberg (DE); Kürsat Petek, Freiberg (DE); Kiran Bangalore Ravi, Paris (FR); Senthil Kumar Yogamani, Headford (IE); Abhinav Valada, Freiberg (DE)

(73) Assignee: QUALCOMM Technologies, Inc., San Diego, CA (US)

( * ) Notice: Subject to any disclaimer, the term of this patent is extended or adjusted under 35 U.S.C. 154(b) by 130 days.

(21) Appl. No.: 18/589,098

(22) Filed: Feb. 27, 2024

(65) Prior Publication Data

US 2025/0209724 A1      Jun. 26, 2025

Related U.S. Application Data

(60) Provisional application No. 63/613,686, filed on Dec. 21, 2023.

(51) Int. Cl.
| | |
|---|---|
| *G06T 15/06* | (2011.01) |
| *G06T 3/4007* | (2024.01) |
| *G06T 7/50* | (2017.01) |
| *G06T 11/00* | (2006.01) |
| *G06V 10/44* | (2022.01) |
| *G06V 10/80* | (2022.01) |

(52) U.S. Cl.
CPC ............ *G06T 15/06* (2013.01); *G06T 3/4007* (2013.01); *G06T 7/50* (2017.01); *G06T 11/003* (2013.01); *G06V 10/44* (2022.01); *G06V 10/806* (2022.01); *G06T 2207/20081* (2013.01)

(58) Field of Classification Search
None
See application file for complete search history.

(56) References Cited

U.S. PATENT DOCUMENTS

2025/0148716 A1*    5/2025   Lee ......................... G06T 7/593

OTHER PUBLICATIONS

Xu X., "Towards Transferable Multi-modal Perception Representation Learning for Autonomy: NeRF-Supervised Masked AutoEncoder", arXiv:2311.13750v2 [cs.CV], pp. 1-11, Dec. 6, 2023, 11 Pages (Year: 2023).*
International Search Report and Written Opinion—PCT/US2024/060601—ISA/EPO—Mar. 12, 2025.

(Continued)

*Primary Examiner* — Robert J Craddock
(74) *Attorney, Agent, or Firm* — QUALCOMM Technologies, Inc.; Espartaco Diaz Hidalgo

(57) ABSTRACT

A device may one or more memories storing the frontal view image. A device may one or more processors coupled to the one or more memories and configured to: obtain, based on the frontal view image and via an implicit field engine in a geometry pathway, a depth map, obtain, based on the frontal view image, a masked image, generate, based on the masked image and via a semantic pathway, a reconstructed image, train, based on the depth map and the reconstructed image, a model; and finetune the model using a portion of task-specific labels to obtain a finetuned model that performs semantic view mapping on input images.

18 Claims, 13 Drawing Sheets

(56)    References Cited

OTHER PUBLICATIONS

Min C., et al., "Multi-Camera Unified Pre-training Via 3D Scene Reconstruction", arXiv:2305.18829v3 [cs.CV], arXiv.org, Oct. 9, 2023, pp. 1-8, Feb. 20, 2025, 8 Pages, XP093252861, sections III and IV; figures 1-5.

Xu X., "Towards Transferable Multi-modal Perception Representation Learning for Autonomy: NeRF-Supervised Masked AutoEncoder", arXiv:2311.13750v2 [cs.CV], pp. 1-11, Dec. 6, 2023, 11 Pages, XP093252854, sections III and IV; figures 1,2.

* cited by examiner

286

8x8x8 Volume Block (Voxel)

255

Sample distance

Block size = 8

USING NEURAL RADIANCE FIELDS FOR LABEL EFFICIENT IMAGE PROCESSING

PRIORITY CLAIM

The present claims priority to U.S. Provisional Application No. 63/613,686 filed on Dec. 21, 2023, the contents of which are incorporated herein by reference.

TECHNICAL FIELD

The present disclosure generally relates to processing images using machine learning systems. For example, aspects of the present disclosure relate to systems and techniques for using neural radiance fields (NERFs) for label efficient image processing (e.g., Bird's Eye View (BEV) semantic segmentation, or other image processing).

BACKGROUND

Various image processing techniques are valuable for many types of systems, such as driving systems (e.g., autonomous or semi-autonomous driving systems), extended reality (XR) systems, robotics systems, among others. In one example, images can be processed to generate semantic Bird's Eye View (BEV) maps from a BEV perspective. Semantic BEV maps can be useful for driving systems (e.g., autonomous driving systems), as they offer rich, occlusion-aware information for height-agnostic applications including object tracking, collision avoidance, and motion control. In other examples, images can be processed to generate semantic segmentation masks, to perform object detection and/or tracking, among others.

In some cases, machine learning systems (e.g., neural networks) can be used to process images and generate a corresponding output (e.g., a semantic BEV map). The machine learning systems can be trained using supervised training, semi-supervised training, unsupervised training, or other type of training technique. Supervised training involves the use of labeled data, such as annotated images. Machine learning-based image processing techniques (e.g., instantaneous BEV map estimation) that do not rely on large amounts of labeled/annotated data can be crucial for the rapid deployment of certain technologies, such as driving systems (e.g., for autonomous or semi-autonomous driving vehicles), XR systems, robotics systems, etc. However, many machine learning-based image processing systems (e.g., existing BEV mapping approaches) follow a fully supervised learning paradigm and thus rely on large amounts of annotated data (e.g., annotated data in BEV). The large amount of annotated data can be arduous to obtain and can hinder the scalability of systems to novel environments.

SUMMARY

Systems and techniques are described herein for using neural radiance fields (NERFs) for label efficient image processing (e.g., Bird's Eye View (BEV) semantic segmentation, or other image processing). In some cases, the systems and techniques can implement an unsupervised representation learning approach to generate an output (e.g., semantic BEV maps, semantic segmentation maps from other perspectives, object detection outputs, etc.) from images, such as from a monocular frontal view (FV) image, in a label-efficient manner. Such systems and techniques can reduce the amount of manual labeling needed for training data (e.g., BEV ground training data) for training models used for various tasks (e.g., autonomous or semi-autonomous driving tasks, XR tasks, robotics tasks such as navigation or scene understanding, or for other tasks).

In one illustrative example, conceptually, a machine learning model (e.g., a neural network) is configured on a device (e.g., a vehicle, an XR device, a robotics system, etc.). The machine learning system can receive a two-dimensional image from a camera configured on the vehicle. The model predicts or estimates a high definition (HD) map or a three-dimensional space (from a bird's eye view) around the device. A large dataset of human labeled images is required for achieving such a task. The systems and techniques described herein provides an approach that reduces the need for manual labeling for training a model to generate such output. The systems and techniques can pretrain a machine learning model (e.g., a neural network model) with images (e.g., frontal view images) such that the machine learning model learns a geometry of a scene and the semantics of the scene. Unannotated images are used to pretrain the network (in an unsupervised manner), which makes it possible to learn required features such that a very small number of labeled BEV images can be used to train the network as part of a finetuning phase. Using such systems and techniques, the machine learning model can provide results that match current state of the art models while using a small amount of annotated data (e.g., 1%, 5% or other relatively small percentage of available labeled data).

In some aspects, the techniques described herein relate to an apparatus to generate a semantic map from one or more images, the apparatus including: one or more memories storing the one or more images; and one or more processors coupled to the one or more memories and configured to: generate, based on the one or more images using an implicit field engine in a geometry pathway of a machine learning model, a depth map; generate, based on the one or more images, a masked image; generate, based on the masked image using a semantic pathway of the machine learning model, a reconstructed image; train, based on the depth map and the reconstructed image, the machine learning model; and finetune the model using a portion of task-specific labels to obtain a finetuned model that performs semantic view mapping on input images.

In some aspects, the techniques described herein relate to a method of generating a semantic map from one or more images, the method including: generating, based on the one or more images using an implicit field engine in a geometry pathway of a machine learning model, a depth map; generating, based on the one or more images, a masked image; generating, based on the masked image using a semantic pathway of the machine learning model, a reconstructed image; training, based on the depth map and the reconstructed image, the machine learning model; and finetuning the model using a portion of task-specific labels to obtain a finetuned model that performs semantic view mapping on input images.

In some aspects, the techniques described herein relate to an apparatus to generate a semantic map from one or more images, the apparatus including: means for generating, based on the one or more images using an implicit field engine in a geometry pathway of a machine learning model, a depth map; means for generating, based on the one or more images, a masked image; means for generating, based on the masked image using a semantic pathway of the machine learning model, a reconstructed image; means for training, based on the depth map and the reconstructed image, the machine learning model; and means for finetuning the model using a portion of task-specific labels to obtain a finetuned model that performs semantic view mapping on input images.

In some aspects, the techniques described herein relate to a non-transitory computer-readable medium having stored thereon instructions which, when executed by one or more processors, cause the one or more processors to be configured to: generate, based on the one or more images using an implicit field engine in a geometry pathway of a machine learning model, a depth map; generate, based on the one or more images, a masked image; generate, based on the masked image using a semantic pathway of the machine learning model, a reconstructed image; train, based on the depth map and the reconstructed image, the machine learning model; and finetune the model using a portion of task-specific labels to obtain a finetuned model that performs semantic view mapping on input images.

In some aspects, the techniques described herein relate to an apparatus to generate a semantic map from one or more images, the apparatus including: one or more memories storing the one or more images; and one or more processors coupled to the one or more memories and configured to: obtain, based on the frontal view image and via an implicit field engine in a geometry pathway, a depth map; obtaining, based on the frontal view image, a masked image; generate, based on the masked image and via a semantic pathway, an intermediate voxel grid; generate, based on the intermediate voxel grid, one or more reconstructed images each associated with a respective future time; train, based on the depth map, the reconstructed image and the one or more reconstructed images each associated with the respective future time, a model; and obtain a finetuned model that performs semantic view mapping on input images by finetuning the model using a portion of task-specific labels.

In some aspects, the techniques described herein relate to a method of generating a semantic map from a frontal view image, the method including: obtaining, based on the frontal view image and via an implicit field engine in a geometry pathway, a depth map; obtaining, based on the frontal view image, a masked image; generating, based on the masked image and via a semantic pathway, an intermediate voxel grid; generating, based on the intermediate voxel grid, one or more reconstructed images each associated with a respective future time; training, based on the depth map, the reconstructed image and the one or more reconstructed images each associated with the respective future time, a model; and obtaining a finetuned model that performs semantic view mapping on input images by finetuning the model using a portion of task-specific labels.

In some aspects, the techniques described herein relate to an apparatus to generate a semantic map from a frontal view image, the apparatus including: means for obtaining, based on the frontal view image and via an implicit field engine in a geometry pathway, a depth map; means for obtaining, based on the frontal view image, a masked image; means for generating, based on the masked image and via a semantic pathway, an intermediate voxel grid; means for generating, based on the intermediate voxel grid, one or more reconstructed images each associated with a respective future time; means for training, based on the depth map, the reconstructed image and the one or more reconstructed images each associated with the respective future time, a model; and means for obtaining a finetuned model that performs semantic view mapping on input images by finetuning the model using a portion of task-specific labels.

In some aspects, the techniques described herein relate to a non-transitory computer-readable medium having stored thereon instructions which, when executed by one or more processors, cause the one or more processors to be configured to: obtain, based on the frontal view image and via an implicit field engine in a geometry pathway, a depth map; obtaining, based on the frontal view image, a masked image; generate, based on the masked image and via a semantic pathway, an intermediate voxel grid; generate, based on the intermediate voxel grid, one or more reconstructed images each associated with a respective future time; train, based on the depth map, the reconstructed image and the one or more reconstructed images each associated with the respective future time, a model; and obtain a finetuned model that performs semantic view mapping on input images by finetuning the model using a portion of task-specific labels.

In some aspects, one or more of apparatuses described herein include a mobile device (e.g., a mobile telephone or so-called "smart phone" or other mobile device), a wireless communication device, a vehicle or a computing device, system, or component of the vehicle, an extended reality device (e.g., a virtual reality (VR) device, an augmented reality (AR) device, or a mixed reality (MR) device), a wearable device, a personal computer, a laptop computer, a server computer, a camera, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
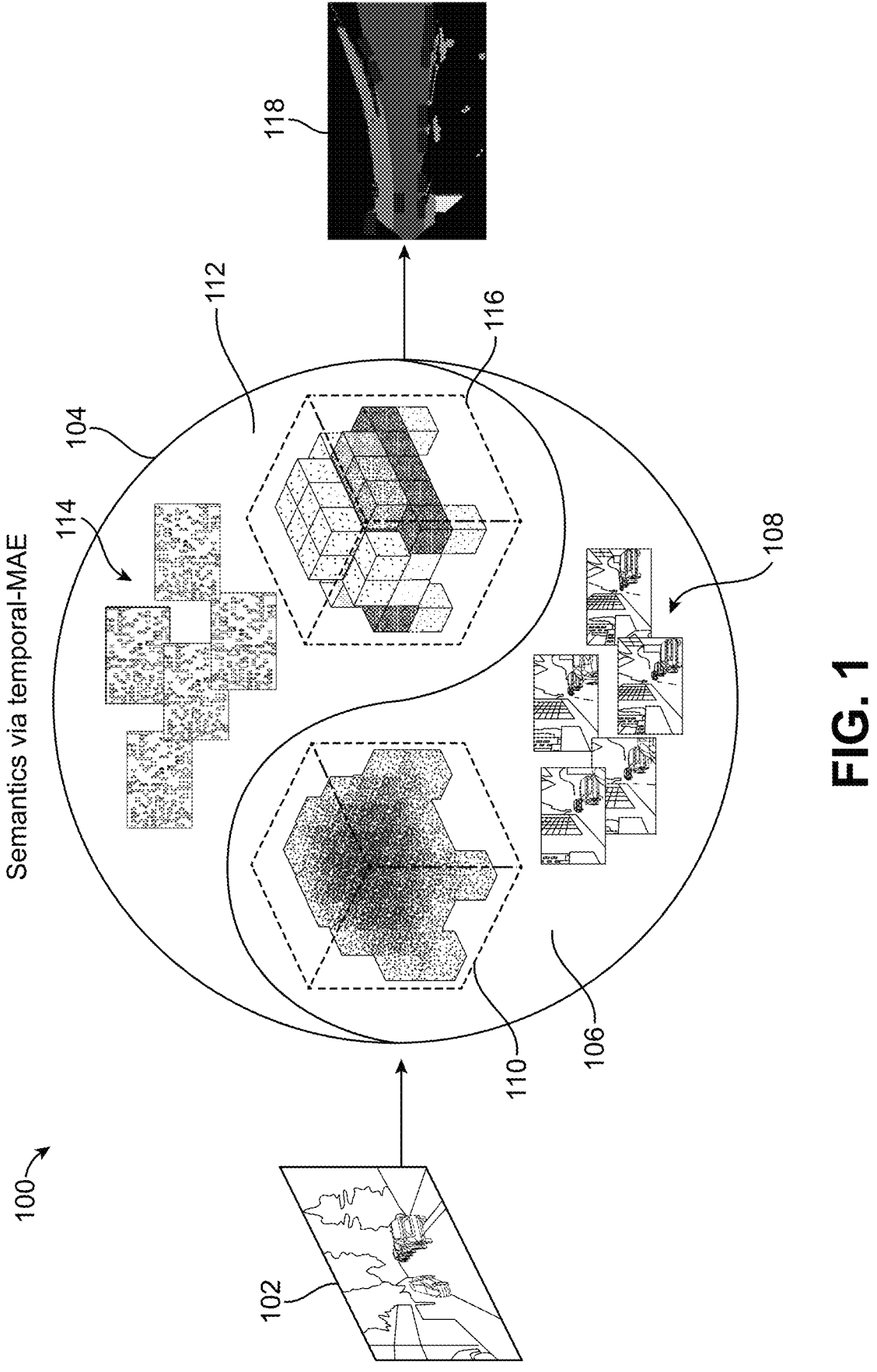
FIG. 1 is a conceptual diagram illustrating an unsupervised framework for label-efficient semantic tasks (e.g., BEV mapping or other task), in accordance with some aspects of this disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As noted previously, machine learning systems (e.g., neural networks) can be used to process images and generate a corresponding output (e.g., a semantic Bird's Eye View (BEV) map, a semantic segmentation map, an object detection output, etc.). Many such machine learning systems are trained using supervised training, which requires the use of labeled data (e.g., annotated images). The labeled data can be difficult to obtain and can limit the scalability of systems to novel environments.

One example of an output that a machine learning model (e.g., a neural network) can be trained to output is a semantic BEV map. Semantic BEV maps offer a rich representation with strong occlusion reasoning for various decision-making tasks, such as in autonomous driving, robotics systems (e.g., for navigation or scene understanding), etc. However, most BEV mapping approaches employ a fully supervised learning paradigm that relies on large amounts of human-annotated BEV ground truth data. In some cases, the problem of using large amounts of labeled/annotated data for supervised learning may be alleviated by leveraging frontal view (FV) semantic labels for learning both scene geometry and generating BEV pseudolabels, or by leveraging semi-supervised learning using pairs of labeled and unlabeled samples. However, the reliance on FV labels as well as the integrated network design of both approaches gives rise to challenges. For example, FV labels offer scene geometry supervision only along class boundaries which limits the geometric reasoning ability of the model. Further, FV labels are dataset-specific and any change in class definition mandates full model retraining. Also, tightly coupled network designs hinder the quick adoption of latest advances from literature.

As noted previously, systems and techniques are described herein for using neural radiance fields (NERFs) for label efficient image processing (e.g., Bird's Eye View (BEV) semantic segmentation, or other image processing). The systems and techniques address the limitation of requiring human intervention by providing an unsupervised representation training/learning approach to generate outputs (e.g., semantic BEV maps, semantic segmentation masks, object detection outputs, etc.) from monocular frontal view (FV) image in a label-efficient manner. While some aspects of this disclosure are described in the context of BEV maps and monocular frontal view images, other tasks and input data are contemplated as well, such as 360-degree input, radar input, video input, light detection and ranging (LI-DAR) input, 3D input, among others.

Some monocular semantic BEV mapping techniques focus on learning a lifting mechanism to transform features from FV to BEV. For example, the transformation can be learned without using scene geometry, which limits their performance in the real world. Other techniques incorporate scene geometry into the neural network design and/or learn a depth distribution to transform features from FV to BEV. Some techniques split the world into flat and non-flat regions and transform them to BEV using two disjoint pathways. In some cases, transformers may be used to generate BEV features from both single image and multi-view images. Some approaches may use multi-modal data to augment monocular cameras. All of these approaches follow a fully supervised learning paradigm and rely on vast amounts of resource-intensive human-annotated semantic BEV labels. Recent approaches reduce reliance on BEV ground truth labels by combining labeled and unlabeled images in a semi-supervised manner or by leveraging FV labels to generate BEV pseudo-labels and train the network in a self-supervised manner. However, these approaches rely on additional labeled data or use tightly coupled network designs which limits their ability to scale to new environments or incorporate the latest advances in literature. This disclosure proposes a novel unsupervised label-efficient approach that first learns scene geometry and scene representation in a modular, label-free manner before adapting to semantic BEV mapping using only a small fraction of BEV semantic labels.

Some techniques may use monocular scene geometry estimation. Scene geometry estimation is a fundamental challenge in computer vision and is a core component of 3D scene reconstruction. Some approaches may use non-learning-based techniques, such as multi-view stereo and visual SLAM (simultaneous localization and mapping), while other approaches leverage learnable functions, such as in the form of ray distance functions or implicit neural fields. Early neural radiance fields (NeRF)-based approaches were optimized on single scenes and relied on substantial amounts of training data. A PixelNeRF approach addresses these issues by conditioning NeRF on input images, enabling simultaneous optimization across different scenes. Recent works improve upon PixelNeRF by decoupling color from scene density estimation, and by using a tri-planar representation to query the neural field from any world point. The disclosed approach leverages implicit fields to generate the volumetric density from a single monocular FV image to constrain features from the uniformly-lifted 2D scene representation features.

Another technique uses scene representation learning. Some approaches use handcrafted augmentations such as image permutation and rotation prediction to learn scene representation; which were primitive and lacked generalization across diverse tasks. Others propose using contrastive learning to learn scene representation, and some build upon the paradigm by removing the need for negative samples during training. Recent works propose masked autoencoders wherein masked input image patches are predicted by the network using the learned high-level understanding of the scene. More recently, foundation models such as a Distillation with NO labels (DINO) DINO and DINOv2 models employ self-distillation on large amounts of curated data to learn rich representations of the scene. However, all these approaches work on single timestep images and fail to leverage scene consistency over multiple timesteps. The disclosed approach leverages the rich representation from the DINOv2 backbone and augment it with a novel temporal masked autoencoding strategy to learn rich scene representations.

The DINOv2 approach is a self-supervised method for training computer vision models. Because DINOv2 is self-supervised, the input data does not require labels, which means models based on the disclosed architecture can learn richer information about the contents of an image. The model can be used for various task types, including depth estimation, semantic segmentation, and instance retrieval. See Maxime Oquab, et al., DINOv2: Learning Robust Visual Features without Supervision, arXiv:2304.07193v1 [cs.CV], 14 Apr. 2023, incorporated herein by reference.

There are several issues that need to be addressed from the current approaches. Given multicamera multi-frame sequences (e.g., 2-5 frames or other numbers of frames), one issue relates to how to learn 3D scene geometry representations without label supervision (or to minimize the amount of manual labeling that is needed) that will improve BEV or 3D semantic scene segmentation tasks. Another issue relates to how to reconstruct 3D voxel features while ensuring occlusion reasoning across different frames temporally. A voxel, in 3D computer graphics, represents a value on a regular grid in three-dimensional space. Another issue relates to how to adapt NERF based architectures while using transformer features. This disclosure addresses these various issues.

The systems and techniques described herein pretrain a machine learning model (e.g., a neural network model) to independently reason about two BEV mapping subtasks of geometry and representation learning using two disjoint neural pathways in an unsupervised manner. The systems and techniques can then finetune the machine learning model for one or more specific tasks (e.g., semantic scene completion and semantic BEV segmentation mapping) using only a relatively small fraction of available labels in the BEV. In one aspect, the small fraction of available labels can be from 0.5% to 10% of available labels. In another aspect, more than 10% of the available labels may be used. Label-free pretraining of the model can be achieved by exploiting spatial and temporal consistency of FV images to learn scene geometry while relying on a temporal masked autoencoder formulation to encode the scene representation. Extensive evaluations on various datasets demonstrate that the disclosed approach performs on par with or better than the state-of-the-art fully-supervised and self-supervised learning approaches while using only, as one example, 1% of BEV labels (e.g., used only for the finetuning phase in which some supervised learning is implemented) and no additional labeled data.

In some aspects, the systems and techniques described herein relate to an apparatus to generate a semantic map from a frontal view image, the apparatus including: one or more memories storing the frontal view image; and one or more processors coupled to the one or more memories and configured to: obtain, based on the frontal view image and via an implicit field engine in a geometry pathway, a depth map; obtain, based on the frontal view image, a masked image; generate, based on the masked image and via a semantic pathway, a reconstructed image; train, based on the depth map and the reconstructed image, a model; and finetune the model using a portion of task-specific labels to obtain a finetuned model that performs semantic mapping on input images. The portion of the task-specific labels can be from 0.5% to 10% of the available task-specific labels.

In some aspects, the systems and techniques described herein relate to a method of generating a semantic map from a frontal view image, the method including: obtaining, based on the frontal view image and via an implicit field engine in a geometry pathway, a depth map; obtaining, based on the frontal view image, a masked image; generating, based on the masked image and via a semantic pathway, a reconstructed image; training, based on the depth map and the reconstructed image, a model; and finetuning the model using a portion of task-specific labels to obtain a finetuned model that performs semantic view mapping on input images.

In some aspects, the systems and techniques described herein relate to a method of generating a semantic map from a frontal view image, the method including: obtaining, based on the frontal view image and via an implicit field engine in a geometry pathway, a depth map; obtaining, based on the frontal view image, a masked image; generating, based on the masked image and via a semantic pathway, an intermediate voxel grid; generating, based on the intermediate voxel grid, one or more reconstructed images each associated with a respective future time; training, based on the depth map, the reconstructed image and the one or more reconstructed images each associated with the respective future time, a model; and obtaining a finetuned model that performs a specific 3D scene understanding task on input images by finetuning the model using a portion of task-specific labels.

Various aspects of the application will be described with respect to the figures.

Figure 7:
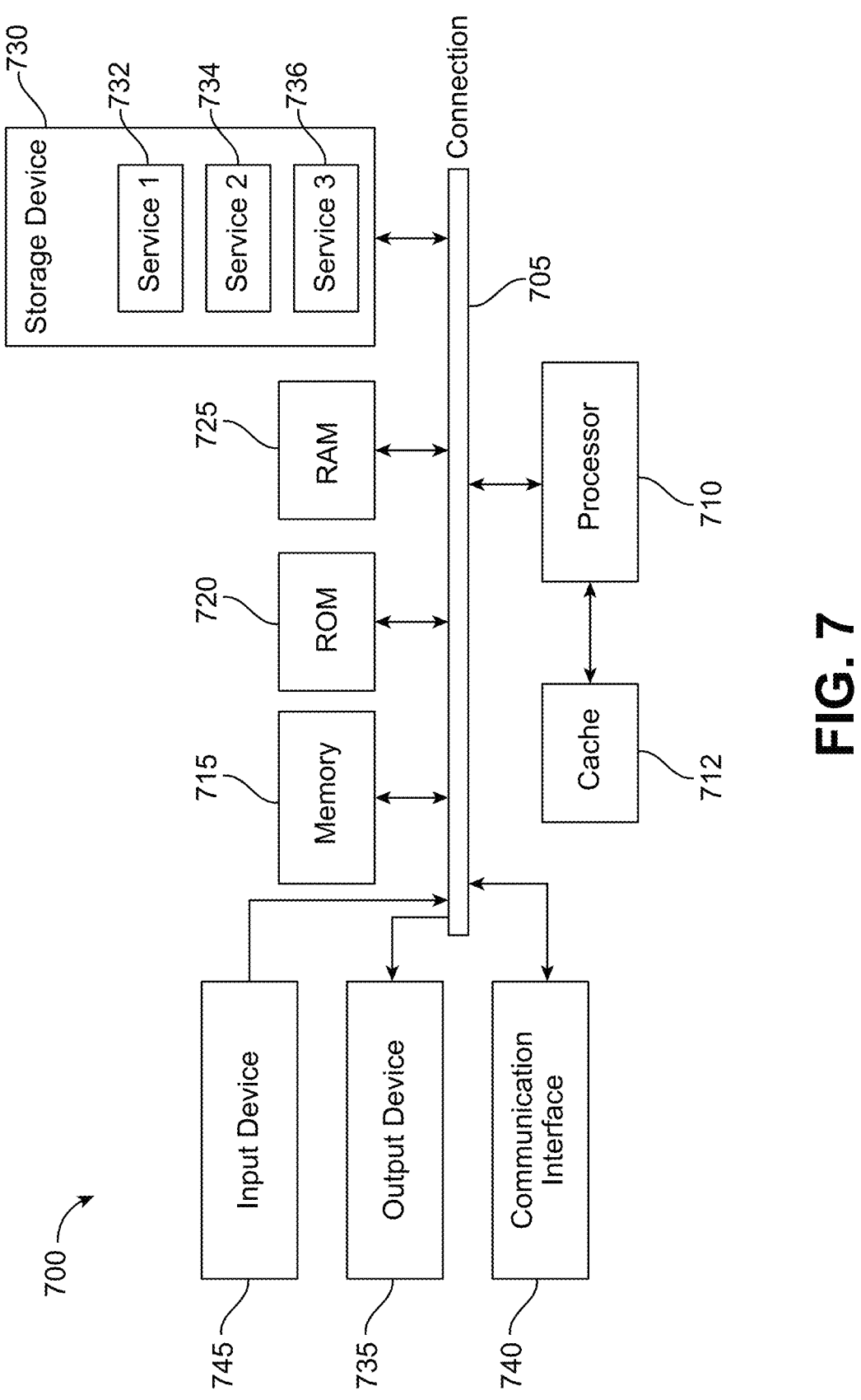
FIG. 7 is a diagram illustrating an example system architecture for implementing certain aspects described herein, in accordance with some aspects of this disclosure.

FIG. 1 is a conceptual diagram 100 illustrating an unsupervised representation learning framework 104 (which can also be referred to as the "system") for label-efficient semantic BEV mapping that utilizes two parallel pathways for data processing and for generating a model via an unsupervised phase and then finetune the model via a supervised phase to generate a finetuned model that can be used for a variety of tasks. The unsupervised representation learning framework 104 can include various components which can be implemented as trainable models, networks, computing components (e.g., as shown in FIG. 7), engines, and so forth to implement the features disclosed herein. Red-green-blue (RGB) image sequences 102 are processed in an unsupervised pretraining step to independently learn, in a first pathway or a semantic pathway 112, a scene representation and, in a second pathway or a geometric pathway 106, a scene geometry.

The semantic pathway 112 and the geometric pathway 106 can represent the splitting of a network or model into two separate components for at least pretraining. The unsupervised representation learning framework 104 can include various components which can include software or hardware components such the system 700 disclosed in FIG. 7 or any of the components disclosed in FIG. 2A. FIG. 1 generally introduces the unsupervised representation learning framework 104 to include two parallel paths for processing data, the first or semantic pathway 112 and the second or geometric path 106. The RGB image sequences 102 are used in the semantic pathway 112 to generate a scene representation including images 114 and a group of voxels 116 or scene semantics via a temporal masked autoencoder (T-MAE). The RGB images sequences 102 are used in the geometric pathway 106 to generate the scene geometry via implicit fields to generate images 108 and a group of voxels 110. A voxel does not typically have its position (e.g., coordinates) explicitly encoded with its values. Instead, a rendering system can infer the position of a voxel based upon its position relative to other voxels (e.g., its position in the data structure that makes up a single volumetric image). Output data 118 is used to adapt to semantic BEV mapping in a label-efficient finetuning step.

The semantic pathway 112 that encodes the semantic features. The network associated with the semantic pathway 112 is trained with a new method of using a temporal mask-autoencoder that encodes a masked images to generate masked features. The masked features are brought into the voxel-space (3D space) and then used to predict the RGB image from the image plus, in future times, based on the current RGB image at the current stamp, future RGB images which can improve the results. These two pathways 112, 106 are kept separate and pretrained separately to generate separate losses.

The above limitations are addressed by the unsupervised representation learning framework or system 104 for predicting semantic BEV maps from monocular FV images in a label-efficient manner. The unsupervised representation learning framework 104 utilizes spatiotemporal consistency and dense representation offered by FV image sequences to alleviate the need for manually annotated data. To avoid manual labeling, the approach is to disentangle the two sub-tasks of semantic BEV mapping, e.g., scene geometry modeling and scene representation learning, into two disjoint neural pathways as shown in FIG. 1 and learn them using an unsupervised pretraining step. The unsupervised representation learning framework 104 then finetunes the resultant model for semantic BEV mapping using only a small fraction of labels in BEV. The unsupervised representation learning framework 104 explicitly learns to model the scene geometry via the geometric pathway by leveraging implicit fields, while learning scene representations via the semantic pathway using a novel temporal masked autoencoder (T-MAE) mechanism. During pretraining, one can supervise the geometric pathway by exploiting the spatial and temporal consistency of the multi-camera FV images across multiple timesteps and train the semantic pathway by enforcing reconstruction of the FV images for both the current and future timesteps using the masked image of only the current timestep. One can extensively evaluate unsupervised representation learning framework 104 on various datasets such as the KITTI-360 and nuScenes datasets and demonstrate that the approach performs on par with existing fully-supervised and self-supervised approaches while using only a small portion (e.g., 1%) of BEV labels, without leveraging any additional labeled data. In some examples, the approach may include using less than 5% or 10% of the BEV labels. Note that the labels may also be task-specific labels that can cover various tasks and not just the tasks disclosed herein by way of example.

Figure 2A:
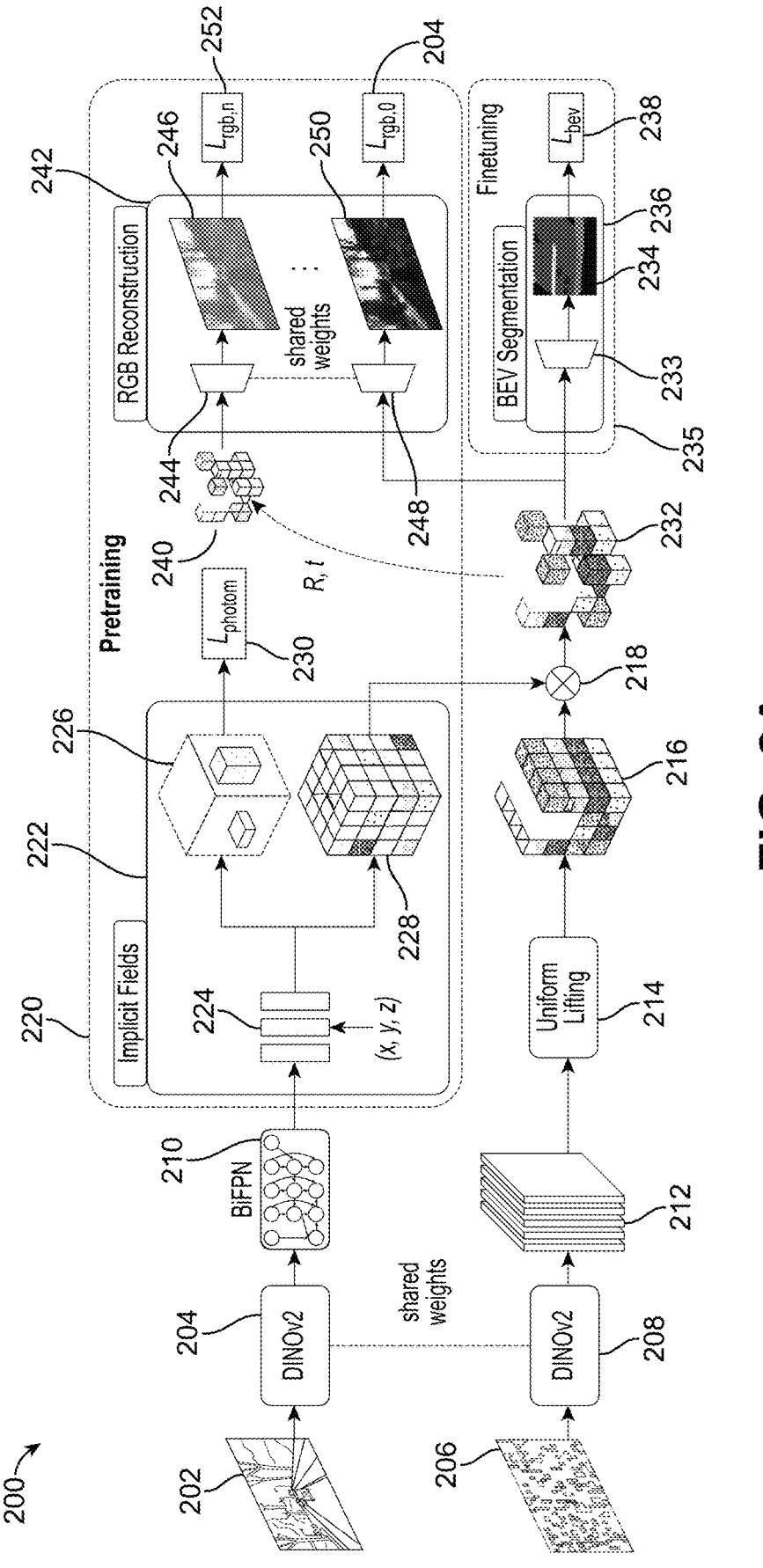
FIG. 2A is a diagram illustrating an overview of a machine learning system that can implement an unsupervised framework for label-efficient tasks (e.g., semantic BEV mapping or other task), in accordance with some aspects of this disclosure.

FIG. 2A is a diagram illustrating an overview of a machine learning system 200 that can utilize the unsupervised representation learning framework 104 of FIG. 1. The machine learning system 200 can include a novel unsupervised representation learning framework for label-efficient semantic mapping in BEV. The approach can include leveraging a monocular frontal view (FV) image sequences to independently model scene geometry and learn scene representation using two disjoint pathways following an unsupervised training paradigm. The resulting model is then finetuned on a small fraction of BEV labels to the task of semantic BEV mapping.

The unsupervised representation learning framework 104 is disclosed for predicting semantic BEV maps from monocular FV images 202 using a label-efficient training paradigm. In some aspects, the approach leverages sequences of multi-camera FV images 202 to learn the two core sub-tasks of semantic BEV mapping, e.g., scene geometry modeling and scene representation learning, using two disjoint neural pathways 112, 106 following a label-free paradigm, before adapting the data to a downstream task in a label-efficient manner. The behavior is achieved by splitting the training protocol into a sequential FV or pretraining phase 220 and a BEV finetuning phase 235. The pretraining phase 220 learns to explicitly model the scene geometry by enforcing scene consistency over multiple views using the photometric loss $\mathcal{P}_{src\ photom}$ 230 while learning the scene representation by reconstructing a masked input image over multiple timesteps using the reconstruction loss $\mathcal{L}_{rgb}$ 245. Upon culmination of the pre-training phase, the BEV finetuning phase 235 adapts the network to the task of semantic BEV mapping using a loss $L_{bev}$ 238 (e.g., a cross-entropy loss) on the small fraction of available BEV labels. The total loss of the network (from losses 230, 245, 249 and 238) can be computed as:

$$\mathcal{L} = \begin{cases} \mathcal{L}_{phantom} + \mathcal{L}_{rgb} & \text{when pretraining} \\ \mathcal{L}_{bev} & \text{when finetuning} \end{cases} \quad (1)$$

In the proposed architecture as shown in the overview of the machine learning system 200 of FIG. 2A a pretrained DINOv2 backbone 204 (e.g., a feature extractor or any backbone) can be used to generate or extract multi-scale features from an input image $\mathcal{I}_0$ 202. A geometry pathway (e.g., pathway 106 shown in FIG. 1) can include a convolution-based adapter model such as a BiFPN (bi-directional feature pyramid network) layer 210 followed by an implicit neural field or implicit field engine 222 to predict the scene geometry or volumetric density 228. The task of the convolution-based adapter model or BiFPN layer 210 is to adapt the multi-scale features from the DINOv2 backbone 204 for the geometry-related task associated with the pretraining operation, such as to learn a scene geometry. The implicit field engine 222 uses continuous field formulation to estimate the density of field.

Figure 3:
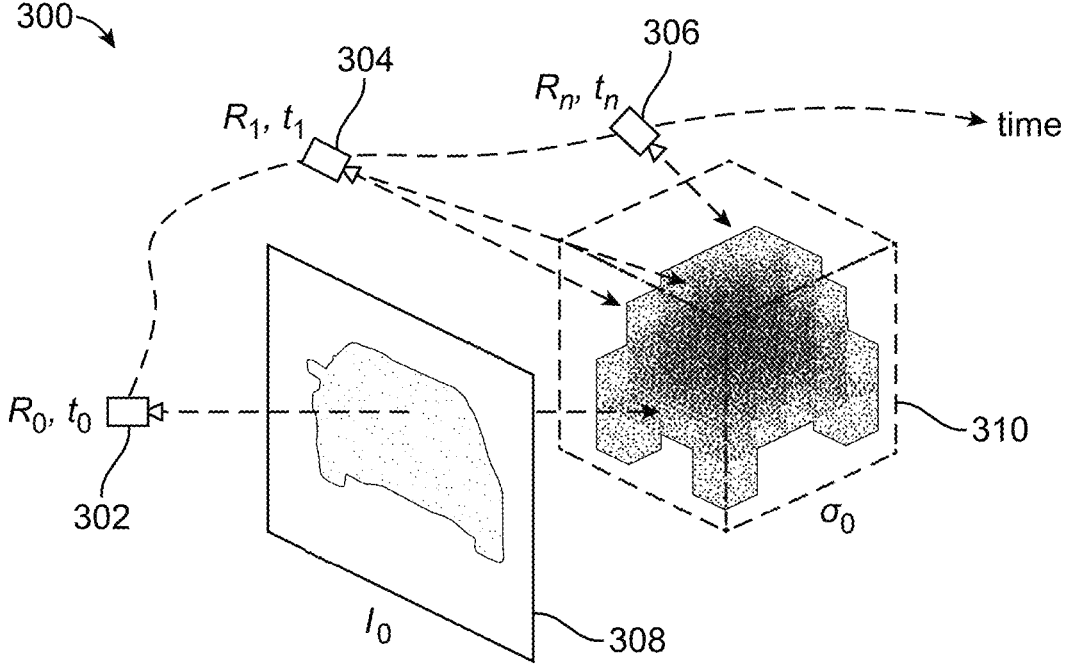
FIG. 3 is a conceptual diagram of a neural implicit field engine, in accordance with some aspects of this disclosure.

The purpose of the geometric pathway 106 is to explicitly model scene geometry in a label-free manner using only the spatio-temporal images 202 obtained from cameras onboard an autonomous vehicle or from other locations. Explicit scene geometry modeling allows the system such as the unsupervised representation learning framework 104 to reason about occlusions and disocclusions in the scene, thus improving the quality of predictions in the downstream task. The task of scene geometry learning is designed using an implicit field formulation configured to estimate the volumetric density 228 (e.g., which can be a voxel) of the scene or images in the camera coordinate system given a monocular FV image 202 (e.g., as shown in FIG. 3). The unsupervised representation learning framework 104 multiplies 218 the estimated volumetric density 228 with the uniformly-lifted semantic features or voxel 3D representation 216 to generate the scene-consistent voxel features 232. The implicit field engine 222 can be trained using a depth estimation which can be estimated using the volumetric density 228 which can be estimated using equations below.

The unsupervised representation learning framework 104 generates the volumetric density 228 for the scene by following, in one aspect, the idea of image-conditioned NeRF. Firstly, the unsupervised representation learning framework 104 obtains the image features f for randomly sampled points, x=(x, y, z) (e.g., the position to sample in 3D space), along every camera ray by projecting them onto a 2D image plane via the DINOv2 backbone 204 and computing the value for each projection location using bilinear interpolation via the BiFPN layer 210. Thus, for each position to sample in the 3D space, the system 104 estimates the value at that position to generate the volumetric density 228 or voxel. The unsupervised representation learning framework 104 then passes the image features along with their positional encodings into a multi-layer perceptron (MLP) 224, $\emptyset$, to estimate the volumetric density 228, $\sigma$, at each of the sampled locations. The MLP 224 may be one layer, two layer, or three or more layers. Mathematically, the volumetric density 228 at location x can be computed as:

$$\sigma_x = \emptyset\left(f_{u_x}, \gamma(u_x, d_x)\right) \tag{2}$$

where $\gamma(\bullet; \bullet)$ represents the sinusoidal positional encoding computed using the 2D projection $u_x$ of x on the image plane and the distance $d_x$ of x from the camera origin. The volumetric density 228 can be used in the semantic pathway 112 for training.

During training, the unsupervised representation learning framework 104 optimizes $\emptyset$ by first computing a depth map from $\sigma$ and then computing a photometric loss 230 between the multi-view FV images at both a current as well as future timesteps. Specifically, for a camera ray through pixel location u, the unsupervised representation learning framework 104 estimates the corresponding depth $\hat{d}_u$ by computing the integral of intermediate depths over the probability of ray termination at a given distance. Accordingly, the unsupervised representation learning framework 104 samples k points, $x_1, x_2, \ldots, x_k$, on each camera ray and computes $\sigma$ at each of these locations. The unsupervised representation learning framework 104 then computes the probability of ray termination $\alpha_i$ between every pair of consecutive points $(x_i, x_{i+1})$ to determine the distance at which the ray is terminated, e.g., the depth $\hat{d}_u$ 226. Mathematically, these processes can be performed using the following example equations:

$$\alpha_i = \exp\left(1 - \sigma_{x_i}\delta_i\right) \tag{3}$$

Figure 4:
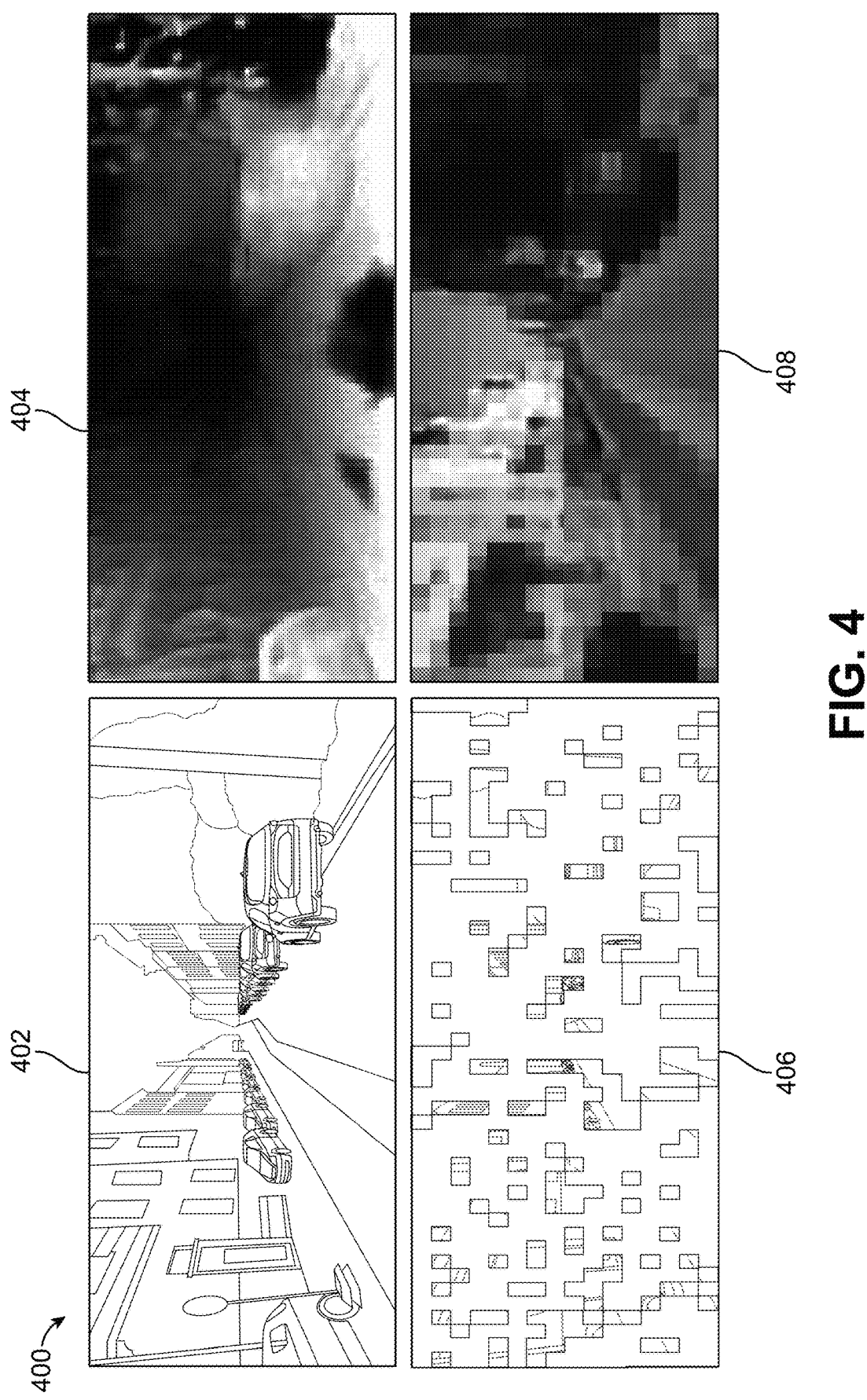
FIG. 4 is a conceptual diagram of various images showing FV predictions from an unsupervised pretraining step, in accordance with some aspects of this disclosure.

-continued $$\hat{d}_u = \sum_{i=1}^{K}\left(\prod_{j=1}^{i-1}(1 - \alpha_j)\right)\alpha_i, d_i \tag{4}$$

where $d_i$ is the distance of $x_i$ from the camera center, and $\delta_i = d_{i+1} - d_i$. A depth map output from the geometric pathway 106 (e.g., as illustrated in FIG. 4) can be used to train the model. The unsupervised representation learning framework 104 uses the computed depth map to supervise (or train) the geometric pathway 106 using the photometric loss 230 between RGB images generated using inverse and forward warping. Inverse warping is described as:

$$I'_{tgt,inv}(\mathcal{P}_{src}) = I_{tgt}\langle KT_{src \to tgt}d(\mathcal{P}_{src})K^{-1}\mathcal{P}_{src}\rangle, \tag{5}$$

where K is the intrinsic camera matrix, $\langle\bullet\rangle$ denotes the bilinear sampling operator, and $\mathcal{P}_{src}$ is a pixel coordinate in the source image. Similarly, forward warping can be described as:

$$I'_{tgt,fwd}\left(KT_{src \to tgt}d(\mathcal{P}_{src})K^{-1}\mathcal{P}_{src}\right) = I_{src}(\mathcal{P}_{src}), \tag{6}$$

The unsupervised representation learning framework 104 can then compute the photometric loss 230 as:

$$\mathcal{L}_{photom} = \|I'_{tgt,inv} - I_{src}\|1 + \|I'_{tgt,fwd} - I_{tgt}\|1. \tag{7}$$

A semantic pathway (e.g., semantic pathway 112 shown in FIG. 1) encompasses a sparse convolution-based adapter (e.g., a DINOv2 backbone 208 or a feature extractor) to capture representation-specific features. An RGB reconstruction head 242 is used to facilitate reconstruction of masked input image patches or scene-consistent voxel features 232, 240 over multiple timesteps. A BEV semantic head 236 can be used to generate a semantic BEV map 234 or semantic BEV predictions, via a BEV semantic segmentation neural network decoder 233, from the input monocular FV image 202 during a finetuning phase 235.

The semantic pathway 112 (or semantic pathway $S$ ) aims to facilitate the learning of holistic feature representations for various scene elements in a label-free manner. The rich pretrained representation enables efficient adaptation to semantic classes during the fine-tuning phase 235. The unsupervised representation learning framework 104 learns the representations of scene elements by masking out random patches in the input image 202 to generate a masked image 206 and then forces the network to generate pixelwise predictions for each of the masked patches (e.g., as shown in FIG. 4). The effort is to generate data for or reconstruct the masked patches from the available data in the unmasked portions of the image. In this disclosure, the RGB data for future timestamps are also predicted based on the known data. Moreover, the unsupervised representation learning framework 104 also exploits the temporal consistency of static elements in the scene by reconstructing the RGB images, via the RGB reconstruction head 242 at future timesteps $t_1, t_2, \ldots, t_n$ using the masked RGB input at timestep $t_0$. The T-MAE model allows the unsupervised representation learning framework 104 to learn spatially and semantically-consistent features which improves its occlusion reasoning ability and accordingly its performance on semantic BEV mapping.

The semantic pathway 112 masks the input image $\mathcal{I}_0$ 202 using a binary mask $M_0$ with a masking ratio m, and generates the corresponding masked semantic 3D voxel grid $$V_0^S$$

or voxel 3D representation 216. The unsupervised representation learning framework 104 then multiplies 218

$$V_0^S$$

218 with the volumetric density 228 (e.g., the volumetric density $\sigma$) obtained from the geometric pathway 106 to generate the intermediate masked voxel grid $V_0$ or scene-consistent voxel features 232. During pretraining, the unsupervised representation learning framework 104 densifies $V_0$ by filling the masked regions using a common mask token [M], and generating pseudo voxel grids $V_{0 \to i}$ by warping $V_0$ using the known camera poses between the current and the $i^{th}$ timesteps via the RGB reconstruction head 242. Mathematically, the approach can be shown by the equation:

$$V_{0 \to i} = T_{0 \to i} V_0 \qquad (8)$$

where $T_{0 \to i}$ is the transformation between camera poses at timesteps $t_0$ and $t_i$. The unsupervised representation learning framework 104 then independently uses the voxel grids $V_0$, $V_{0 \to 1}$, $V_0$, . . . , $V_{0 \to i}$ as inputs to the RGB reconstruction head 242 to reconstruct the RGB images $\mathcal{I}_0$, $\mathcal{I}_{0 \to 1}$, $\mathcal{I}_{0 \to 2}$, . . . $\mathcal{I}_{0 \to i}$. The unsupervised representation learning framework 104 computes the loss $L_2$ 245, 249 on the normalized pixel values of every patch between $\mathcal{I}_k$ and $\mathcal{I}_k$ to generate the supervision for the semantic pathway $S$. The unsupervised representation learning framework 104 thus computes the reconstruction of the loss 245, 249 as:

$$\mathcal{L}_{rgb} = \sum_{i=0}^{n} \left\| \mathcal{I}_i^{\mathcal{P}} - \hat{\mathcal{I}}_{0 \to i}^{\mathcal{P}} \right\|_2, \qquad (9)$$

where Ip denotes the per-patch normalized image.

Tracking or forecasting are example tasks in an inference phase (contrasted from the training phase) can be tasks that can be enabled using the future predicting process in the RGB reconstruction head 242. Live tasks such as tracking or forecasting where one needs to estimate where a car will be, for example, can be implemented using the future prediction shown in the pretraining phase 220 of FIG. 2A.

During pretraining, an input image $\mathcal{I}_0$ 202 is processed by the DINOv2 backbone 204 to generate feature maps of three scales in some aspects. The geometry pathway 106 processes these multi-scale features using a layer which, for example, can be a BiFPN (bi-directional feature pyramid network) layer 210 followed by an implicit field engine 222 to generate the volumetric density 228 of the scene at the current timestep. The BiFPN layer 210 in some aspects can represent a weighted BiFPN which is a type of feature pyramid network which allows easy and fast multi-scale feature fusion. The BiFPN layer 210 can incorporate a multi-level feature fusion idea from FPN, a path aggregation network (e.g., PANet) and a neural architecture search-feature pyramid network (NAS-FPN) model that enables information to flow in both the top-down and bottom-up directions, while using regular and efficient connections. The BiFPN layer 210 can also utilize a fast normalized fusion technique. Traditional approaches usually treat all features input to the FPN equally, even those with different resolutions. However, input features at different resolutions often have unequal contributions to the output features. Thus, the BiFPN layer 210 can add an additional weight for each input feature allowing the network to learn the importance of each. All regular convolutions are also replaced with less expensive depthwise separable convolutions.

Comparing with PANet, PANet added an extra bottom-up path for information flow at the expense of more computational cost. Whereas BiFPN optimizes these cross-scale connections by removing nodes with a single input edge, adding an extra edge from the original input to output node if they are on the same level, and treating each bidirectional path as one feature network layer (repeating it several times for more high-level future fusion).

In a parallel branch to the geometric pathway 106, the semantic pathway 112 can include a masking engine (not shown) that can randomly mask non-overlapping patches in $\mathcal{I}_0$ 202 to generate a masked image 206 or visible patches and a DINOv2 backbone 208 then processes the masked image 206 to generate the corresponding image features. The DINOv2 backbone 204 can have shared or similar weights to the DINOv2 backbone 208. The unsupervised representation learning framework 104 then remaps the visible patch features to 2D, after which the semantic pathway $S$ generates the representation-specific features using an adaptive layer 212 (e.g., a five-layer adapter) that ensures propagation of masked regions using a convolution masking strategy. The output of the adaptive layer 212 are features in a 2D space. The unsupervised representation learning framework 104 then uniformly lifts via a uniform lifting engine 214 the resultant 2D features from the adaptive layer 212 to a voxel 3D representation 216 using a camera projection equation. At each location, you copy and paste the 2D features or project that into 3D location space. The approach is a uniform lifting where the system has no knowledge of geometry at this stage. The value at the respective 2D location is just copied into the 3D positions. The unsupervised representation learning framework 104 then multiplies, via a multiplier 218, the voxel 3D representation 216 with the volumetric density 228 computed from the geometric path 106 to generate or obtain scene-consistent voxel features 232. The scene-consistent voxel features 232 are geometrically consistent as well as semantically consistent. Holes in the voxel 3D representation 216 are the holes carried in from the regions from the masked portions of the masked image 206. The holes in 232 are from both the lack of data due to image masking, as well as the empty regions in the scene predicted by the geometry neck.

The unsupervised representation learning framework 104 can warp the scene-consistent voxel features 232 into a voxel grid or voxel features 240 to multiple timesteps using the ego-motion and collapse it into 2D by applying the camera projection equation along the depth dimension. The RGB reconstruction head 242 then predicts via a decoder 248 (which can be a head or a temporal masked autoencoder (T-MAE) processing the scene-consistent voxel features 232) for the initial time value 0 and decoder 244 (which can be a head or a T-MAE having shared weights or similar weights for processing the voxel features 240) for the other future time steps to obtain the pixel values 246 for each of the masked patches to reconstruct the image at different timesteps. For example, the T-MAE is a mechanism that uses the masked RGB image at the current timestep to reconstruct the RGB image at both the current timestep and one or more future timesteps. The decoder 244 can represent an instance of the RGB reconstruction head 242 (or a group of convolutional layers that map the intermediate voxel grid to an output space) with, in some aspects, similar weights as the decoder 248 used for timestep $t_0$. In some aspects, the semantic pathway 112 describes the process of using a single masked input RGB image to reconstruct the RGB image at both the current and future timesteps. In other words, it is not a module, rather a mechanism that is proposed herein. During the finetuning phase 235, the unsupervised representation learning framework 104 disables image masking and orthographically collapses the voxel features along the height dimension to generate the BEV features. A BEV semantic head 236 (including a BEV semantic segmentation neural network decoder 233) processes via a model these features to generate the semantic BEV map 234 with a loss $L_{bev}$ 238.

The RGB reconstructions for $t_0$, $t_1$, $t_2$, $t_3$, etc use the initial time step $t_0$ data plus the new time steps. The training for the future time steps is done in a supervised manner using the corresponding current data for $t_0$ and then that data, or errors or loss 245, 249 are used to train the entire network. The single model can be used for any 3D tasks in the downstream domain. The pretrained model can be used for tasks such as semantic scene segmentation, prediction paths, or other multiple downstream tasks. The approach can also be used for multiple time steps. One can provide multiple RGB images and can be used to predict 3D images for a number of extensions or tasks. The input can change depending on the task. For example, temporal images, spatial images, 3D images, 360 degree images, radar data, LiDAR (light detection and ranging) data, and so forth can be provided based on what the task is. The approach provides more consistency across time for predictions for future time predictions. From a single image, data about the 3D space around the car can be more knowledgeable to enhance the future predictions of the 3D space.

The output of the pretraining phase 220 is a model that is pretrained. The pretrained model can then be finetuned (using the loss $L_{bev}$ 238 in FIG. 2A and/or the losses 264, 272 in FIG. 2B) using the finetuning phase 235. The system is set up for finetuning by disabling image masking and discarding the RGB reconstruction head 242. The unsupervised representation learning framework 104 finetunes via the finetuning phase 235 the network or model on the semantic BEV mapping by training the model on a fraction (e.g., less than 5% or 10%, such as 1%) of BEV ground truth semantic labels using the cross entropy loss function. Mathematically, the loss can be a cross-entropy loss and defined as follows in some examples:

$$\mathcal{L}_{bev} = CE\left(B, \hat{B}\right), \quad (10)$$

where $B$ and $\hat{B}$ are the semantic BEV ground truth and semantic BEV prediction masks, respectively.

Quantitative and qualitative results of the disclosed unsupervised label-efficient semantic BEV mapping framework and extensive ablative experiments can be used to demonstrate the benefit of the disclosed concepts. In one example, the unsupervised label-efficient semantic BEV mapping framework can be evaluated on two large-scale autonomous driving datasets, such as KITTI-360 and nuScenes. Since neither dataset provides semantic BEV labels, one can adopt the label generation pipeline outlined in PoBEV with minor modifications to discard the occlusion mask to generate the semantic BEV ground truth labels. The system can sample one forward-facing perspective image from either fisheye camera for multi-camera supervision in KITTI-360 but use only a single camera when training on nuScenes due to the lack of sufficient field-of-view overlap between the spatial cameras. For the KITTI-360 dataset, the approach can be to hold out sequence 10 for validation and use the remaining 8 sequences for training. For the nuScenes dataset, the approach can perform a train-val split.

An example training protocol for the unsupervised representation learning framework 104 can include training on images of size 448×1344, and 448×896 for KITTI-360 and nuScenes, respectively. One can select these image sizes to ensure compatibility with both DINOv2 backbone 204, 208 as well as the lower scales of the BiFPN adapter engine of BiFPN layer 210, since they are divisible by both 14 and 32. The pretraining phase follows a label-free paradigm and trains the network using only spatio-temporal FV images with a window size of 4 and masking ratio of 0.75 for 20 epochs with an initial learning rate (LR) of 0.005 which is decayed by a factor of 0.5 at epoch 15 and 0.2 at epoch 18. One can finetune the network on the task of semantic BEV mapping for 100 epochs using only a fraction (e.g., 1%) of BEV labels for the KITTI-360 dataset and one sample from every scene for the nuScenes dataset $$\left(\approx \frac{1}{40}\%\right).$$

One can use an LR of 0.005 during the finetuning phase and decay it by a factor of 0.5 at epoch 75 and 0.2 at epoch 90. One can optimize the unsupervised representation learning framework 104 using the SGD optimizer with a batch size of 12, momentum of 0.9, and weight decay of 0.0001. For all experiments, one can use a frozen DINOv2 ViT-b backbone pretrained on the LVD-142M dataset.

One can evaluate the impact of different masking ratios on the overall performance of the model. Testing shows that a masking ratio of 75% can be ideal for a novel temporal masked autoencoding mechanism with a mean intersection over union (mIoU) of 29.96 as shown in Table 1. Lower masking ratios may not present a sufficiently challenging pretraining task and thus result in only marginal improvements over other models, while higher masking ratios mask out a significant portion of vital information resulting in worse performance as compared to a model with no masked autoencoding. For example, an ablative study of the impact on the masking radio, based on experiments with the KITT-360 dataset using 1% of the BEV labels, results in the data in Table 1:

TABLE 1

| Masking Ratio | 0% | 25% | 50% | 75% | 90% |
|---|---|---|---|---|---|
| mIoU | 27.75 | 27.87 | 28.22 | 29.96 | 27.31 |

In some aspects, one can pretrain the network using image windows of size 4, 6, 8 and 10 and finetune the resultant model on a percentage (e.g., 1%) of semantic BEV labels. In some aspects, a particular window size such as size 4 generates a best mean intersection over union (mIoU) score and performs better on all the dynamic object classes.

Figure 2B:
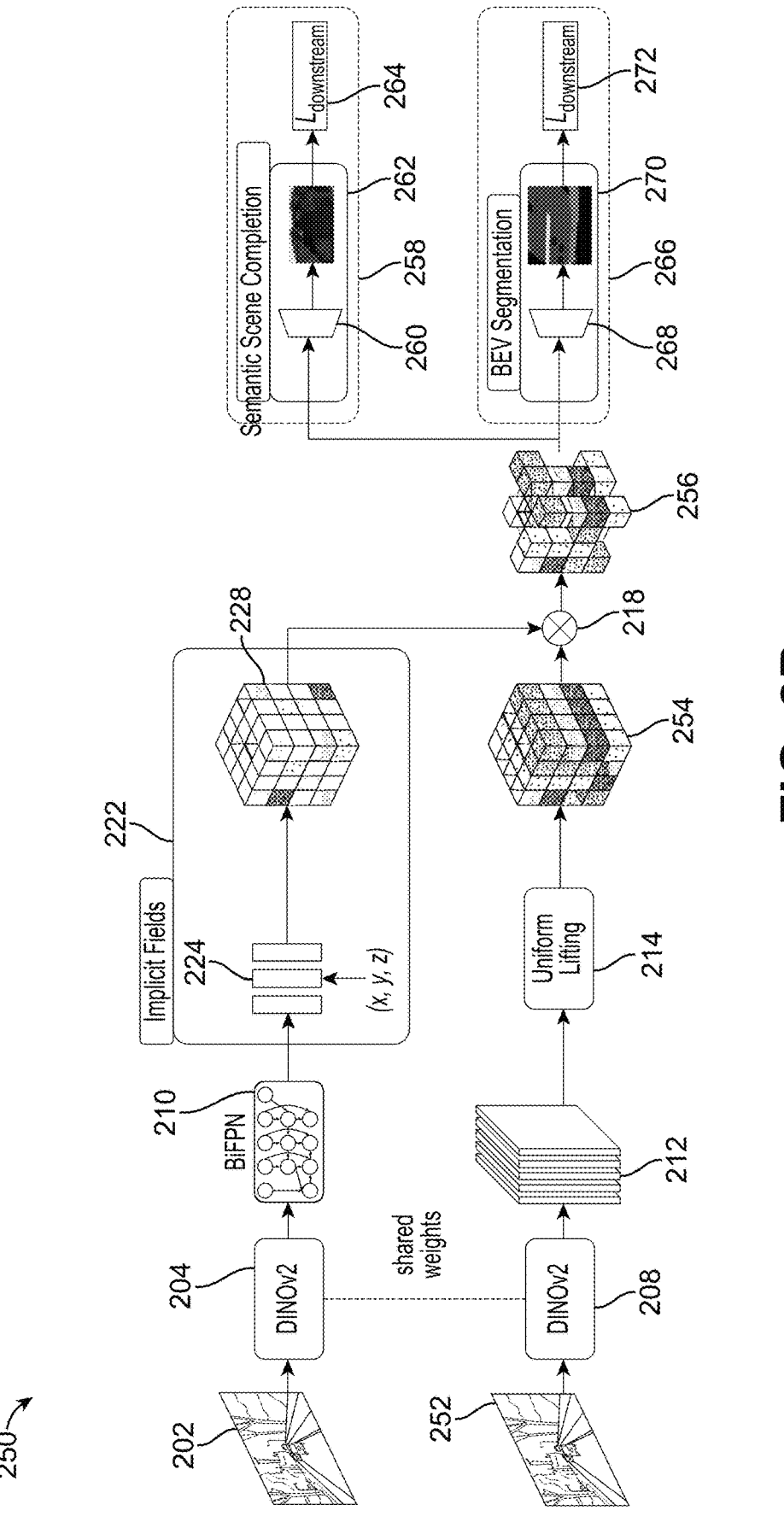
FIG. 2B is a diagram illustrating an example of a machine learning system during a finetuning phase, in accordance with some aspects of this disclosure.
Figure 2C:
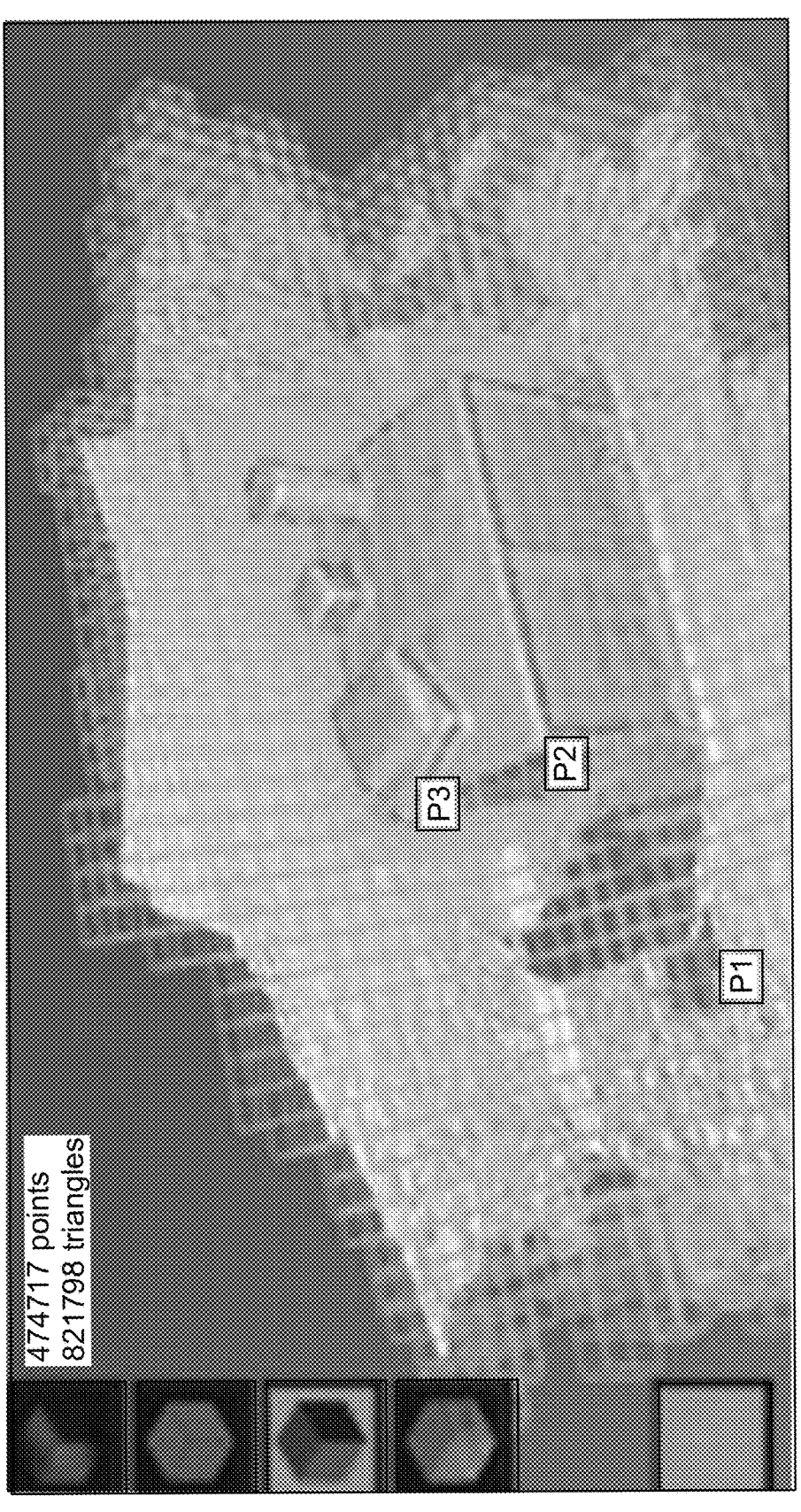
FIG. 2C is a diagram illustrating an example of a 3D surface reconstruction of a scene modeled as a volume grid, in accordance with some aspects of this disclosure.

As this disclosure relates to rendering three-dimensional data, FIGS. 2C-2F illustrates a process for reconstruction of three-dimensional images. Three-dimensional reconstruction (3DR) techniques can be used to reconstruct a 3D scene of an environment. FIG. 2C shows an example of a scene that has been modeled as a 3D sparse volumetric representation for 3DR. In particular, FIG. 2C is a diagram illustrating an example of a 3D surface reconstruction 275 of a scene modeled with an overlay of a volume grid containing voxel blocks. For 3DR, a camera (e.g., a stereo camera) may take photos of the scene from various different viewpoints and angles. For example, a camera may take a photo of the scene when the camera is located at position P1. Once multiple photos have been taken of the scene, a 3D representation of the scene can be constructed by modeling the scene as a volume grid with 3D blocks (e.g., composed of sets of voxels).

In one or more examples, an image (e.g., a photo) of a voxel (e.g., within a 3D block, also referred to as a volume block, including a number of voxels, such as 8×8×8 voxels located at point P2 within the scene may be taken by a camera (e.g., a stereo camera) located at point P1 with a certain camera pose (e.g., at a certain angle). The camera can capture both depth and color. From the image, it can be determined that there is an object located at point P2 with a certain depth and, as such, there is a surface. As such, it can be determined that there is an object that maps to a particular voxel. An image of a voxel located at point P3 within the scene may be taken by the same camera located at the point P1 with a different camera pose (e.g., with a different angle). From the image, it can be determined that there is an object located at point P3 with a certain depth and having a surface. As such, it can be determined that there is an object that maps to the particular voxel. An integrate process can occur where all of the blocks within the scene are passed through an integrate function. The integrate function can determine depth information for each of the voxels from the depth frame and can update each block to indicate whether the voxel has a surface or not. The voxels that are determined to have a surface can then be updated with a color.

In one or more examples, the pose of the camera can indicate the location of the camera (e.g., which may be indicated by location coordinates X, Y) and the angle that the camera (e.g., which is the angle that the camera is positioned in for capturing the image). Each block (e.g., the block located at point P2) has a location (e.g., which may be indicated by location coordinates X, Y, Z). The pose of the camera and the location of each block can be used to map each block to world coordinates for the whole scene.

In one or more examples, to achieve fast multiple access to 3D blocks (e.g., voxels), instead of using a large memory lookup table, various different volume block representations may be used to index the blocks in the 3D scene to store data where the measurements are observed. Volume block representations that may be employed can include, but are not limited to, a hash map lookup, an octree, and a large blocks implementation.

Figure 2D:
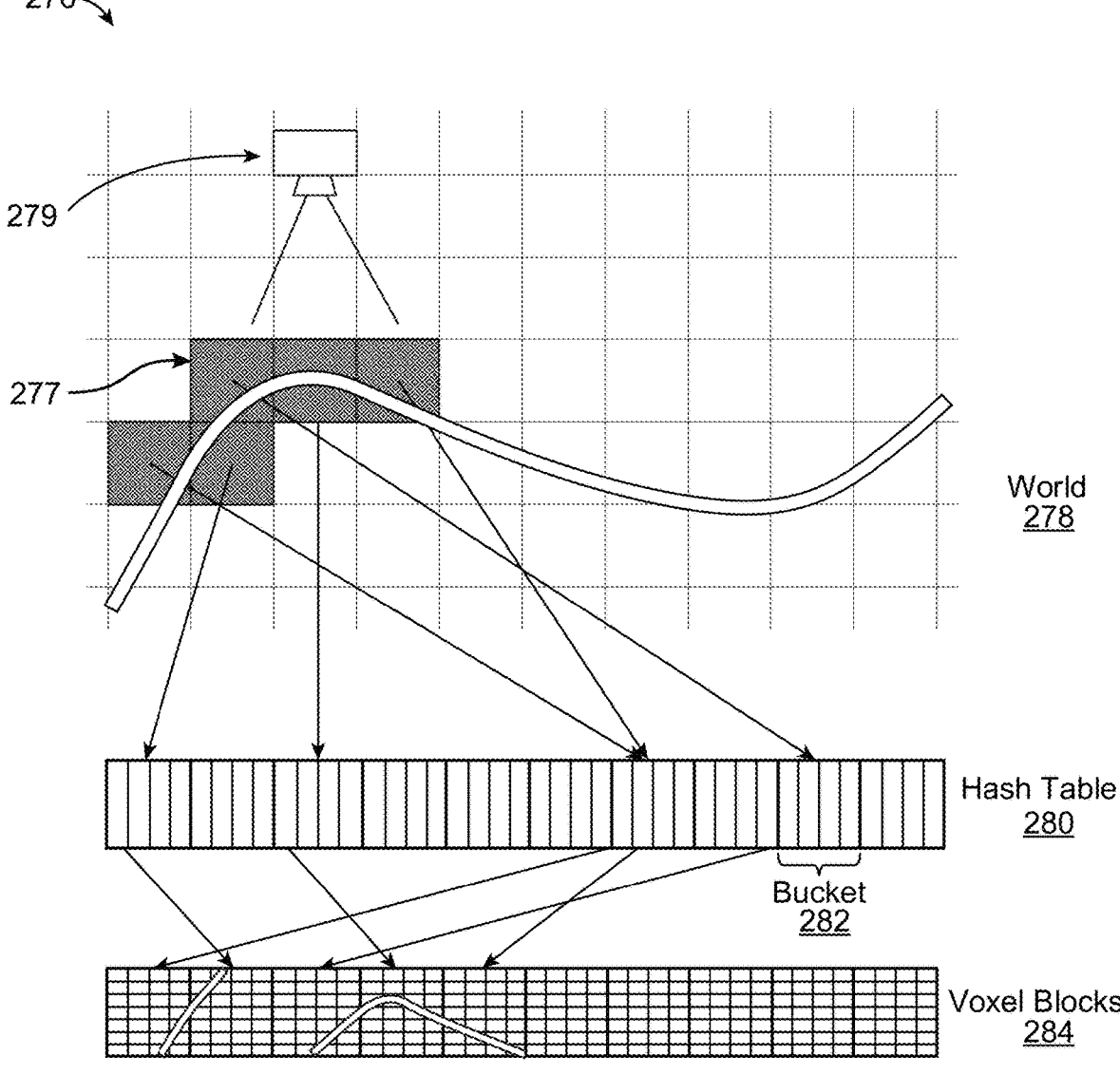
FIG. 2D is a diagram illustrating an example of a hash mapping function for indexing blocks (e.g., voxels) in a volume grid, in accordance with some aspects of this disclosure.

FIG. 2D shows an example of a hash map lookup type of volume block representation for observed data 277 by a camera 279. In particular, FIG. 2D is a diagram illustrating an example of a hash mapping function 276 for indexing voxel blocks 284 in a volume grid. In FIG. 2D, a volume grid is shown with world coordinates 278. Also shown in FIG. 2D are a hash table 280 and voxel blocks 284. In one or more examples, a hash function can be used to map the integer world coordinates 278 into hash buckets 282 within the hash table 280. In one or more examples, the integer world coordinates 278 can be floating point numbers that are converted (e.g., by dividing an environment into blocks) to integers for lookup within the hash table 280. The hash table 280 can include hash buckets 282 which can each store a small array of points to regular grid voxels blocks 284. Each voxel block in the voxel blocks 284 contains data that can be used for depth integration.

Figure 2E:
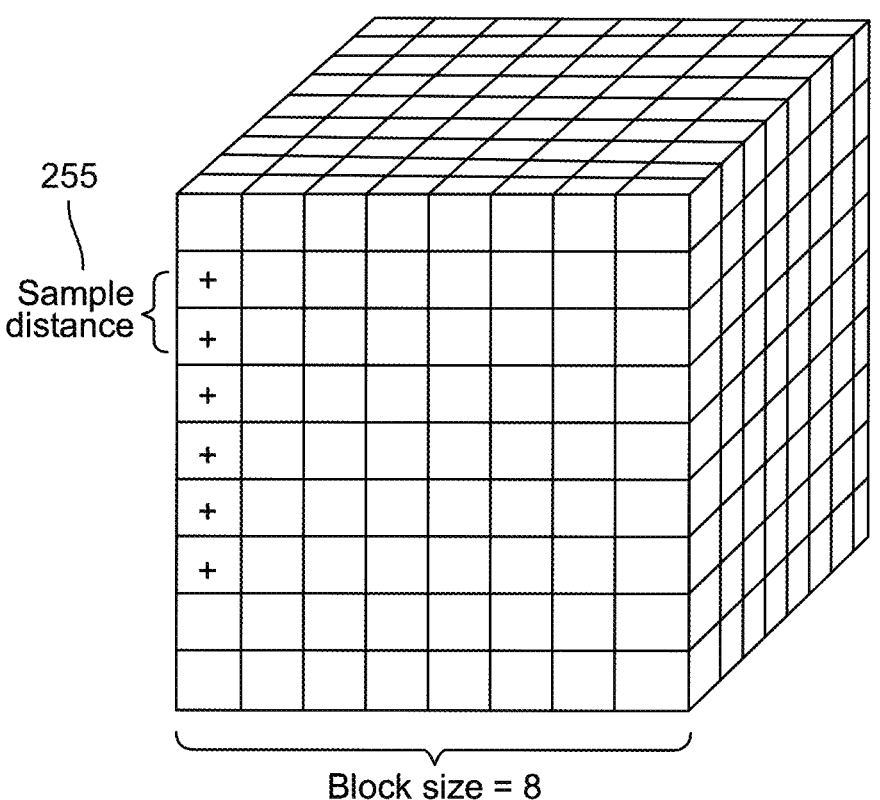
FIG. 2E is a diagram illustrating an example of a block (e.g., a voxel), in accordance with some aspects of this disclosure.

FIG. 2E is a diagram illustrating an example of a volume block (e.g., a set of voxels) 286. In FIG. 2E, the volume block 286 is shown to comprise a set of eight by eight by eight (8×8×8) voxels. For instance, the volume block 286 can be composed of 8×8×8 voxels, with each voxel covering a space of 5 cm (e.g., corresponding to a sampling distance 255), in which case the entire volume block 286 covers the space of 40 cm×40 cm×40 cm.

In one or more examples, each voxel can contain truncated signed distance function (TSDF) samples, a RGB, and a weight. TSDF is a function that measures the distance d of each pixel from the surface of an object to the camera. A voxel with a positive value for d can indicate that the voxel is located in front of a surface, a voxel with a negative value for d can indicate that the voxel is located inside (or behind) the surface, and a voxel with a zero value for d can indicate that the voxel is located on the surface. The distance d is truncated to [−1, 1], such that:

$$tsdf = \begin{cases} -1, & \text{if } d \leq -\text{ramp} \\ \dfrac{d}{\text{ramp}}, & \text{if } -\text{ramp} < d < \text{ramp} \\ 1, & \text{if } d \geq \text{ramp} \end{cases}$$

$$sample \cdot tsdf = \left( \frac{sample \cdot weight * sample \cdot tsdf + tsdf}{sample \cdot weight + 1} \right)$$

A TSDF integration or fusion process can be employed that updates the TSDF values and weights with each new observation from the sensor (e.g., camera).

Figure 2F:
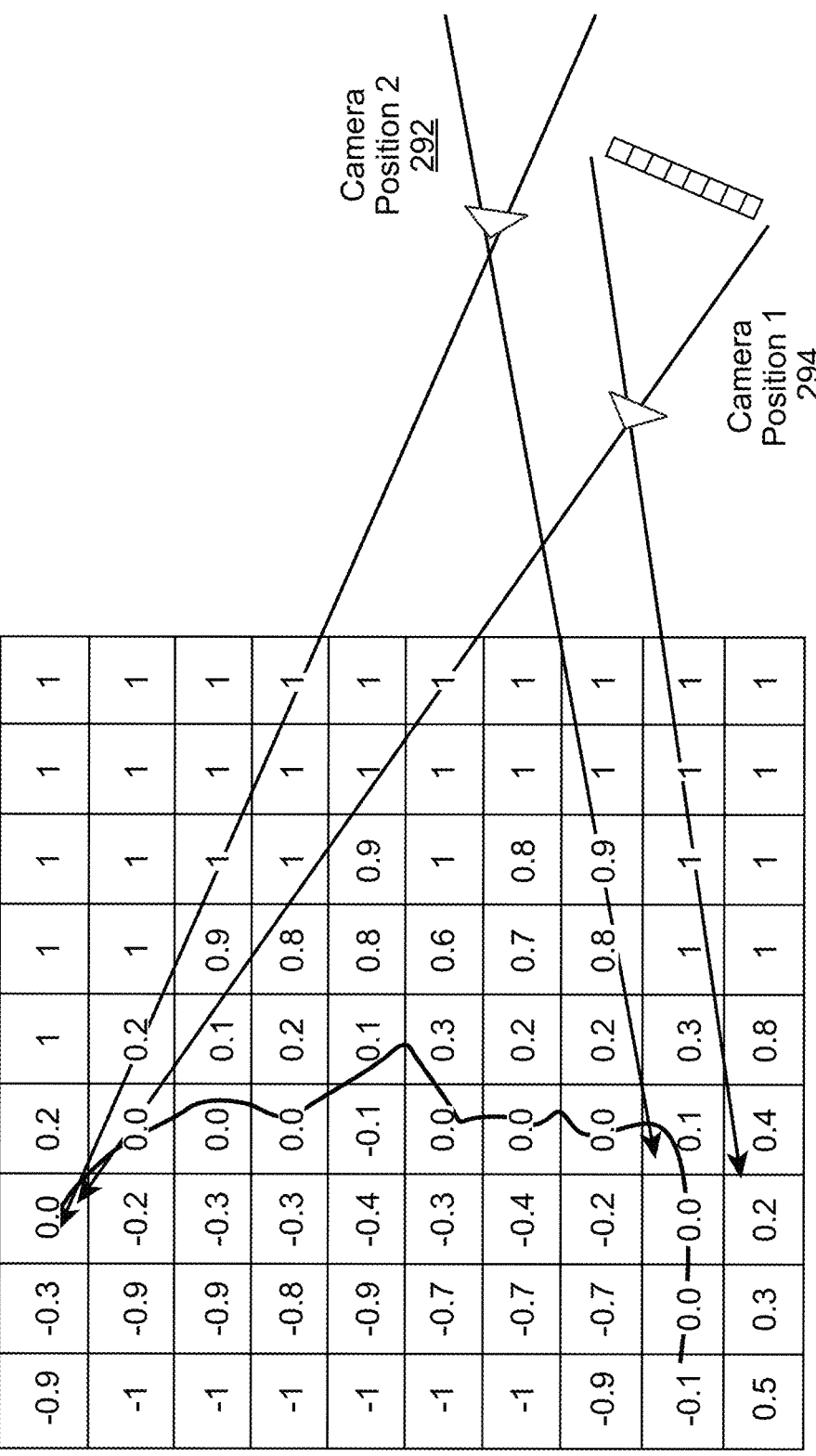
FIG. 2F is a diagram illustrating an example of a truncated signed distance function (TSDF) volume reconstruction, in accordance with some aspects of this disclosure.

FIG. 2F is a diagram illustrating an example of a TSDF volume reconstruction 290. In FIG. 2E, a voxel grid including a plurality of voxels is shown. A camera is shown to be obtaining images of a scene (e.g., person's face) from two different camera positions (e.g., camera position 1 294 and camera position 2 292). During operation for TSDF, for each new observation (e.g., image) from the camera (e.g., for each image taken by the camera at a different camera position), the distance (d) of a corresponding pixel of each voxel within the voxel grid can be obtained. A truncation distance threshold can be applied on computed signed distance function (SDF) values to be within a range (e.g., −1, 1). The ramp function in the above equation facilitates determinations of a vicinity (e.g., voxels) where SDF updates are applied. The TSDF values (and color values) can be updated in the global memory. In FIG. 2E, the voxels with positive values are shown to be located in front of the person's face, the voxels with negative values are shown to be located inside of the person's face, and the voxels with zero values are shown to be located on the surface of the person's face.

In 3DR, a 3D scene can be reconstructed from 2D depth frames and color frames. To accomplish such a reconstruction, the scene may be divided into 3D blocks (e.g., voxels). Each voxel can be projected onto a 2D depth frame and a 2D color frame to determine the voxel's depth and color. Once all of the voxels for the depth frame and color frame are updated accordingly, the process can be repeated for a new depth frame and color frame set. The pretraining phase 220 is an unsupervised learning phase.

FIG. 2B is a diagram illustrating an example of a machine learning system 250 during a finetuning phase 235 (e.g., after the machine learning system 200 of FIG. 2A is pretrained). A first image 202 and a second image 252 are provided to the system. The first image 202 is processed to obtain a depth map or volumetric density 228 and the second image is processed to obtain a voxel 254 which is added to the depth map or volumetric density 228 to generate a voxel 256. Note that the second image 252 is not masked because image masking is disabled in the finetuning phase 235. The voxel 256 is then processed by a semantic scene completion component 258 with a decoder 260 to generate an output 262 with a loss 264. The voxel 256 is also processed by a BEV segmentation component 266 via decoder 268 to generate output data 270 and a loss 272. The RGB reconstruction head 242 from FIG. 2A is replaced in FIG. 2B with task-specific decoders 260, 268.

The components in the pretraining phase 220 that are trained through backpropagation of the loss 245, 249 can include one or more of the BiFPN layer 210, the MLP 224, the adaptive layer 212, and the decoders 244, 248 of the RGB reconstruction head 242. In the finetuning phase 235, only the DINOv2 backbone 204, 208 are fixed and one or more of the other components are finetuned to obtain or generate the finetuned model or network. The losses 264, 272 are used for finetuning the weights in the various models. The approach is to finetune the model based on a fraction of the labeled data relative to the number of manual labels used in the prior training approaches.

FIG. 3 is a conceptual diagram 300 illustrative an example of a neural implicit field engine 222, in accordance with some aspects of this disclosure. A first camera $R_0$ 302 at a first time $t_0$ is used to compute a first image 308 (shown as a first image $I_0$). In some cases, the image features f can be extracted or retrieved for randomly sampled points, x=(x, y, z), along every camera ray by projecting them onto the 2D image plane and computing the value for each projection location using bilinear interpolation. The new camera positions 304, 306 are represented as $R_1 \ldots R_n$ and the new time steps are defined as $t_1 \ldots t_n$. One can then pass the image features along with their positional encodings into the MLP 224 which can be a two-layer MLP by way of example. The illustration of the neural implicit field engine 222 shows how it can leverage spatio-temporal consistency offered by multi-camera images to model the scene geometry $\sigma_0$ 310.

FIG. 4 is a conceptual diagram 400 of various images showing FV predictions from an unsupervised pretraining step, in accordance with some aspects of this disclosure. The diagram 400 shows the impact of the use of temporal masked autoencoders (T-MAE) for improving BEV fine tuning after pre-training with the use of the implicit field engine 222. The semantic pathway 112 aims to facilitate the learning of holistic feature representations for various scene elements in a label-free manner. The rich pretrained representation enables efficient adaptation to semantic classes during the finetuning phase 235. The unsupervised representation learning framework 104 learns the representations of scene elements by masking out random patches in the input image 202 to generate a masked image 206 and then forces the network to generate pixel-wise predictions for each of the masked patches.

FIG. 4 illustrates the FV predictions in the unsupervised pretraining step. A FV image 402 is processed by the geometric pathway 106 to generate or obtain a volumetric density of the field which generates a depth map 404 upon ray casting. In parallel, a masked FB image 406 is processed by the semantic pathway 112 to reconstruct the masked image 408.

One can also exploit the temporal consistency of static elements in the scene by reconstructing the RGB images at future timesteps $t\_1, t\_2, \ldots, t\_n$ using the masked RGB input at timestep $t\_0$ as shown in FIG. 2A. The novel formulation of temporal masked autoencoding (T-MAE) allows the network to learn spatially- and semantically-consistent features which improves its occlusion reasoning ability and accordingly its performance on semantic BEV mapping.

Figure 5A:
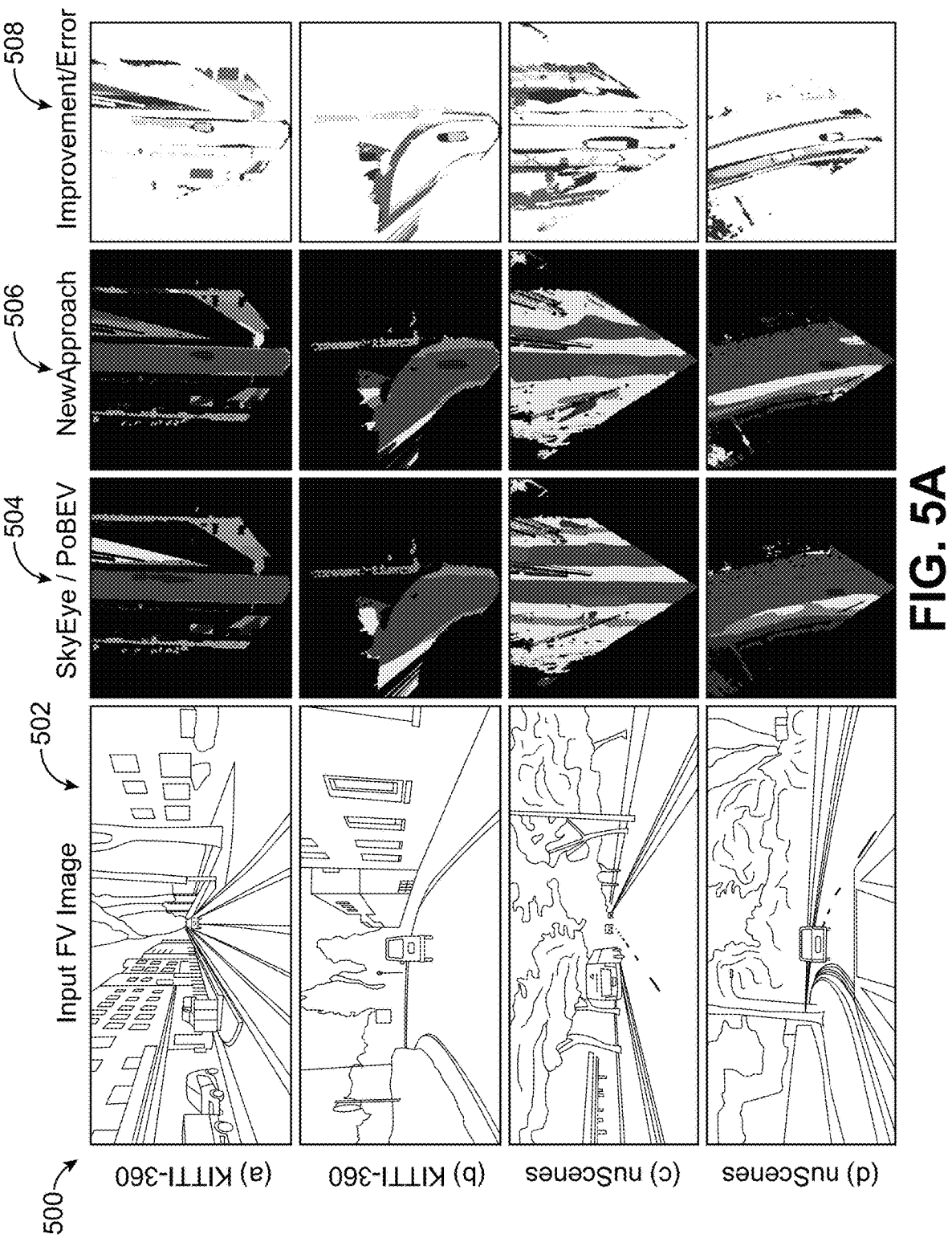
FIG. 5A is a conceptual diagram of various images showing qualitative results of the unsupervised learning framework, in accordance with some aspects of this disclosure.

FIG. 5A is a conceptual diagram 500 of various images showing qualitative results of the unsupervised learning framework, in accordance with some examples. Input FV images 502 are shown from different KITTI-360 datasets and nuScenes datasets. The processing of the FV input images 502 by the SkyEye/PoBEV model 504 compared to the system 506 disclosed herein are provided with the improvement/error map 508 shown. The improvement/error map 508 for each dataset of FV input images 502 highlights pixels where the disclosed unsupervised representation learning framework 104 outperforms the baseline, or where the baseline outperforms the disclosed system or where both models misclassify the input region.

Figure 5B:
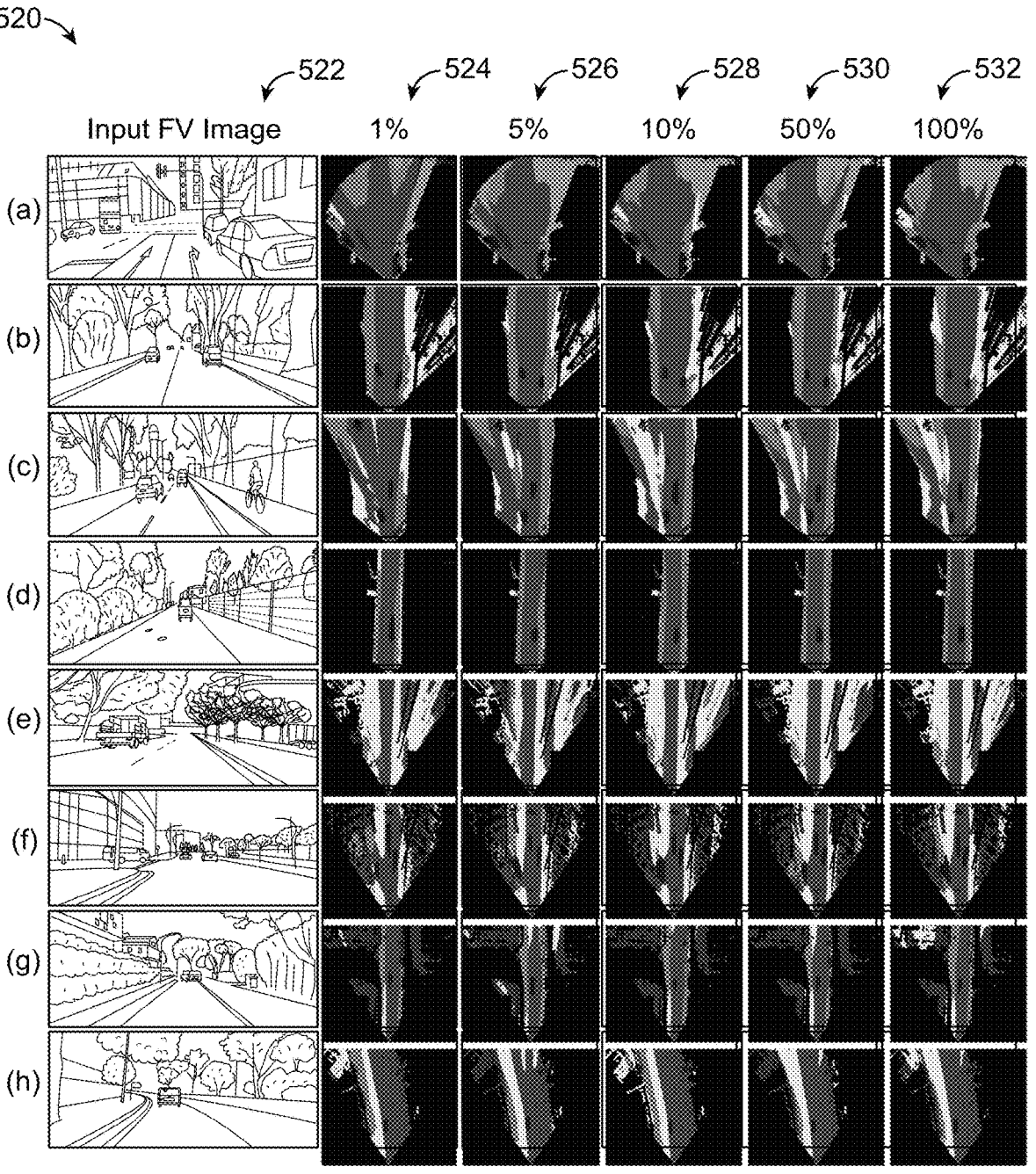
FIG. 5B is a conceptual diagram of various images showing quantitative results when finetuning use different percentages of labels in BEV, in accordance with some aspects of this disclosure.

FIG. 5B is a conceptual diagram of various images 520 showing quantitative results when finetuning use different percentages of labels in BEV, in accordance with some aspects of this disclosure. Various output images 522 (images (a)-(h)) are shown with the qualitative results from finetuning using 1% of the labels in BEV 524, 5% of the labels in BEV 526, 10% of the labels in BEV 528, 50% of the labels in BEV 530 and 100% of the labels in BEV 532. FIG. 5B illustrates the qualitatively evaluate the performance of the model by comparing the semantic BEV maps obtained when the amount of BEV supervision is gradually increased from 1% to 100%. FIG. 5A with images (a), (b), (c) and (d) present the results on the KITTI-360 dataset. Images (e), (f), (g) and (h) represent the results on the nuScenes dataset.

The semantic BEV map predictions are largely consistent across all the percentage splits of the two datasets with only minor differences pertaining to the predicted object extents. The behavior is evident in FIG. 5B with image (d) and (f) where the model finetuned with 1% of BEV data tends to stretch objects along the radial direction, while models fine-tuned with higher percentage splits are not significantly affected by this factor. Moreover, the 1% (or other portion) model is able to both detect and localize all the objects in the BEV map to a high degree of accuracy, with only minor errors in the heading of the detected objects (see image (c)). Further, with images (a), (f) and (h), the model finetuned with 1% labels is able to accurately reason about occlusions in the scene, such as the road behind the truck in image (a) and the regions beyond the curve in the road in image (h). The occlusion handling ability stems from the use of an independent implicit field-based geometry pathway to reason about the scene geometry in the unsupervised pretraining step. In some cases, however, the scene priors learned during the pretraining step do not generalize well to a given image input. For example, in image (c), the grass patch next to the vehicle in the adjacent lane is erroneously predicted as road for the 1% model, while the models fine-tuned with more than 10% BEV data accurately capture this characteristic. Nonetheless, these observations reinforce the fact that the disclosed unsupervised pretraining step encourages the network to learn rich geometric and semantic representations of the scene which allows models finetuned with extremely small BEV percentage splits to generate accurate BEV maps.

The present disclosure provides for a multicamera multi-frame 3D structure extraction model. The model takes as input geometric features evaluated using MAE DINOV2-fused features to build view-point invariance by using image sequences and different cameras in the vehicle or source object. The unsupervised representation learning framework 104 predicts a NERF based density field (probabilistic occupancy) which is used to predict depth. An output voxel grid is fed to a BEV segmentation/3D semantic scene completion head for 3D object detection or other tasks. Multiple voxel-features from different time and viewpoints can used to provide complete segmentation. The approach improves the prediction of 3D Object size in BEV segmentation/3D scene completion. The approach can arbitrarily be extended to multiple camera viewpoints spatially and temporally and to different applications.

In some aspects, training of one or more of the machine learning systems or neural networks described herein (e.g., such as the machine learning system 200 of FIG. 2A, the machine learning system 250 of FIG. 2B, and/or other machine learning systems, models, or networks described herein) can be performed using online training, offline training, and/or various combinations of online and offline training. In some cases, online may refer to time periods during which the input data (e.g., such as the input image 202 and/or masked image 206 of FIG. 2A and/or FIG. 2B, etc.) is processed, for instance for performance of the label efficient image processing implemented by the systems and techniques described herein. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others.

Figure 6:
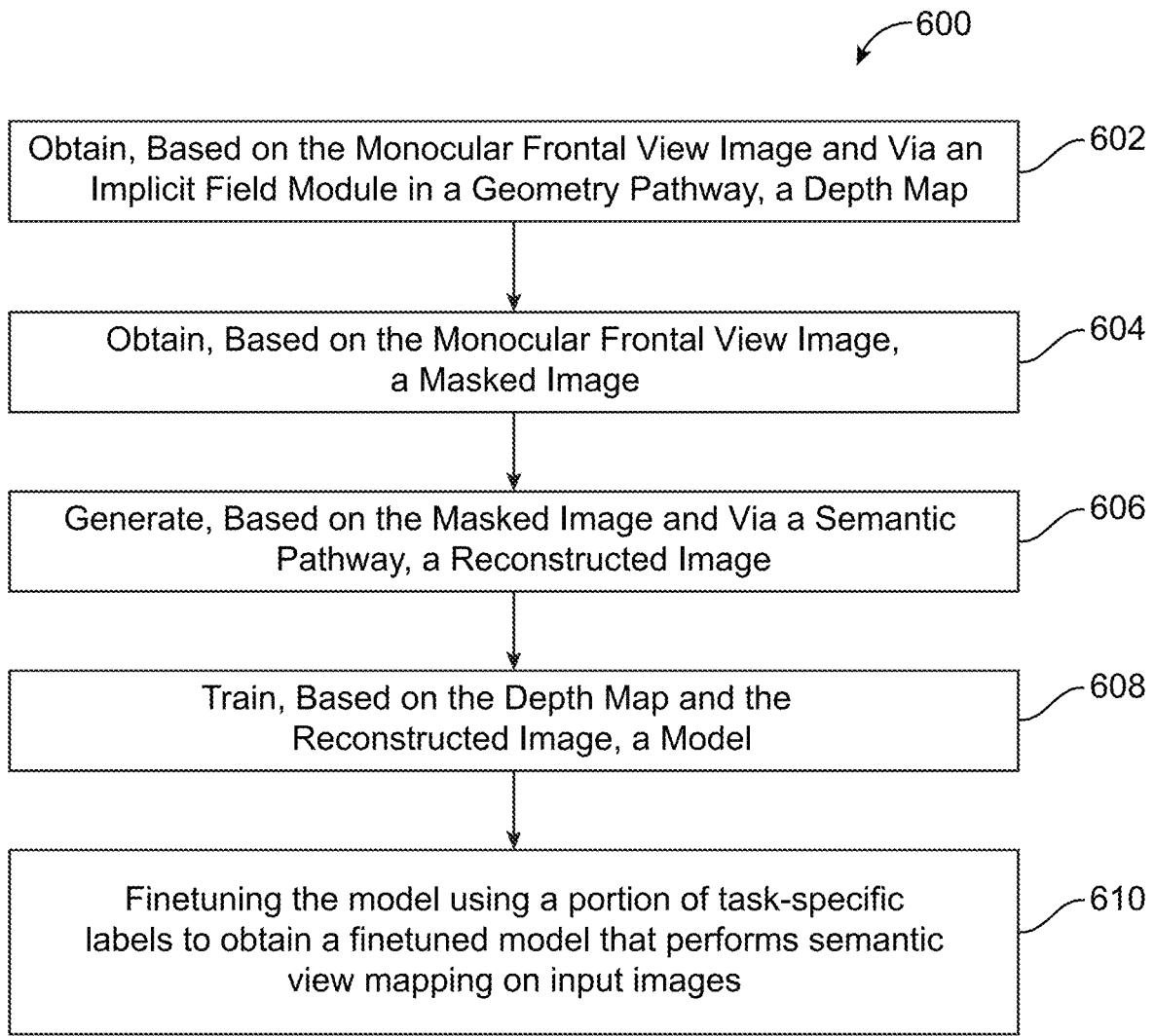
FIG. 6 is a flow diagram illustrating an example process, in accordance with some aspects of this disclosure.

FIG. 6 is a flowchart illustrating an example process 600 for generating a semantic map from a monocular frontal view image as described herein. In one example, the process 600 can be performed by one or more of the unsupervised representation learning framework 104 and one or more of the components of the overview of the machine learning system 200 of the framework in FIG. 2A, a geometric path 106, a semantic pathway 112, the computing system 700, or a combination thereof. For instance, a computing device with the computing device architecture of the computing system 700 shown in FIG. 7 can implement the operations of FIG. 6 and/or the components and/or operations described herein with respect to any of FIGS. 1, 2A, 2B, 3, and/or 6.

At operation 602, the system (e.g., the unsupervised representation learning framework 104 or at least one subsystem thereof) can and is configured to, and can obtain, based on the monocular frontal view image and via an implicit field engine 222 in a geometry pathway, a depth map or volumetric density 228. The system may be further configured to generate a volumetric density of a field which is used to generate the depth map upon ray casting.

At operation 604, the system (e.g., the unsupervised representation learning framework 104 or at least one subsystem thereof) can and is configured to obtain, based on the frontal view image, a masked image.

At operation 606, the system (e.g., the unsupervised representation learning framework 104 or at least one subsystem thereof) can and is configured to generate, based on the masked image and via a semantic pathway, a reconstructed image. In some aspects, as part of the pretraining phase 220, the unsupervised representation learning framework 104 can reconstruct at least one non-masked image for at least one corresponding future time stamp. The operation of reconstructing the at least one non-masked image for at least one corresponding future time stamp can include using the reconstructed image associated with a first time to for reconstructed images for one or more future time stamps. For example, the system 104 can be configured to use a current masked image to reconstruct a current and/or future time-stamped images.

At operation 608, the system (e.g., the unsupervised representation learning framework 104 or at least one subsystem thereof) can and is configured to train, based on the depth map and the reconstructed image, a model. Operation 608 can complete a pretraining step which can be unsupervised and which can result in a trained model which can then be used for many tasks as well as can be finetuned.

At operation 610, the system (e.g., the unsupervised representation learning framework 104 or at least one subsystem thereof) can and is configured to finetune the model using a portion of task-specific labels to obtain a finetuned model that performs semantic view mapping on input images. The portion of the task-specific labels can be less than 5% or, for example, may be 1% of the available labels. The finetuning operation can be supervised in the sense that a small fraction of the labels of the data can be used for finetuning the various components of the unsupervised representation learning framework 104.

In some aspects, the system can, through the implicit field engine 222, further be configured to generate the depth map by (1) projecting image features for sampled points on the monocular frontal view image on a two-dimensional image plane; (2) computing a value for each projection location of a plurality of projection locations on the two-dimensional image plane using bilinear interpolation; and (3) passing an image feature with positional encodings based on the value to a multi-layer perceptron (MLP).

In some aspects, the system or the unsupervised representation learning framework 104 can and is configured to generate, via a transformer, transformed-based features at a plurality of different scales, fuse the transformed-based features at the plurality of different scales to generate input data; and provide the input data to the implicit field engine to generate the depth map.

In some aspects, the unsupervised representation learning framework 104 can and is configured to reconstruct, using the masked image, a non-masked image using a temporal masked auto-encoder that uses temporal consistency by randomly masking patches of the frontal view image while minimizing photometric and red-green-blue losses. Masking patch sizes for how an input image is masked in the T-MAE module can influence the performance of the model. In some aspects, one can pretrain the model using masking patches of size 14, 28 and 56 and then finetune the resultant model on a percentage (e.g., 1% or 5%) of the BEV labels. In some aspects, a masking patch size of 28 gives the highest mean intersection over union (mIoU) score across the various evaluated patch sizes. A smaller patch size does not mask out enough of an object and consequently does not present a challenging reconstruction task during the unsupervised pretraining phase. A larger patch size masks out significant distinguishing regions in the image which hinders the representation learning ability of the network during the pretraining phase. The effect of patch sizes is noticeable across all classes while being significant for dynamic objects which experience a substantial reduction in the IoU scores when too little of the object is masked out. Given these observations, in one aspect, the system 104 can use a patch size of 28 as an example.

In some aspects, the task-specific labels can be associated with one or more of depth estimation, semantic segmentation, instance retrieval, semantic scene segmentation tasks, 3D scene generation based on input two dimensional images, and autonomous driving. The tasks may relate to finetuning of a model or for dynamic or inference real-time tasks.

In some aspects, the semantic map can be associated with generating a bird's eye view of a scene associated with the frontal view image. The frontal view image can include one of a monocular frontal view image, a temporal image, a spatial image, a 3D image, a 360 degree images, a radar data, or LiDAR data.

In some aspects, a non-transitory computer-readable medium having stored thereon instructions which, when executed by one or more processors, cause the one or more processors to perform operations according to any of operations 602-610. In another example, an apparatus can include one or more means for performing operations according to any of operations 602-610.

In some examples, the apparatus to generate a semantic map from a frontal view image, the apparatus can include means for obtaining, based on the frontal view image and via an implicit field engine in a geometry pathway, a depth map; means for obtaining, based on the frontal view image, a masked image; means for generating, based on the masked image and via a semantic pathway, a reconstructed image; means for training, based on the depth map and the reconstructed image, a model; and means for finetuning the model using a portion of task-specific labels to obtain a finetuned model that performs semantic view mapping on input images. The means for performing any one or more of these operations can include one or more of the unsupervised representation learning framework 104 and any one or more of subcomponents therefore, the computing system 700, or a combination or subcomponent thereof. For instance, a computing device with the computing device architecture of the computing system 700 shown in FIG. 7 can implement the operations of FIG. 6 and/or the components and/or operations described herein with respect to any of FIGS. 1, 2A, 2B, and 3.

In some aspects, an apparatus to generate a semantic map from a frontal view image including one or more memories storing the frontal view image; and one or more processors coupled to the one or more memories and configured to: obtain, based on the frontal view image and via an implicit field engine in a geometry pathway, a depth map; obtain, based on the frontal view image, a masked image; generate, based on the masked image and via a semantic pathway, a reconstructed image; train, based on the depth map and the reconstructed image, a model; and finetune the model using a portion of task-specific labels to obtain a finetuned model that performs semantic view mapping on input images.

This disclosure presents the first unsupervised representation learning approach for predicting semantic BEV maps from monocular FV images using a label-efficient learning paradigm. The approach leverages the spatio-temporal consistency and rich scene semantics offered by FV image sequences to independently learn the sub-tasks of BEV mapping, e.g., scene geometry estimation and scene representation learning, in an unsupervised pre-training step. The approach finetunes the resultant model on the BEV segmentation task using only a small fraction of labels in BEV. Using extensive evaluations on the KITTI-360 and nuScenes datasets, the inventors have demonstrated that the unsupervised representation learning framework 104 performs on par with the existing fully-supervised and self-supervised approaches while using only 1% of BEV labels and without relying on any additional source of labeled supervision.

In some aspects, the process 600 can include a variation on these steps to include one or more of obtaining, based on the frontal view image and via an implicit field engine in a geometry pathway, a depth map; obtaining, based on the frontal view image, a masked image; generating, based on the masked image and via a semantic pathway, an intermediate voxel grid; generating, based on the intermediate voxel grid, one or more reconstructed images each associated with a respective future time; training, based on the depth map, the reconstructed image and the one or more reconstructed images each associated with the respective future time, a model; and obtaining a finetuned model that performs semantic view mapping on input images by finetuning the model using a portion of task-specific labels.

In some aspects, an apparatus to generate a semantic map from a frontal view image, the apparatus can include one or more means for obtaining, based on the frontal view image and via an implicit field engine in a geometry pathway, a depth map; means for obtaining, based on the frontal view image, a masked image; means for generating, based on the masked image and via a semantic pathway, an intermediate voxel grid; means for generating, based on the intermediate voxel grid, one or more reconstructed images each associated with a respective future time; means for training, based on the depth map, the reconstructed image and the one or more reconstructed images each associated with the respective future time, a model; and means for obtaining a finetuned model that performs semantic view mapping on input images by finetuning the model using a portion of task-specific labels.

In some aspects, a non-transitory computer-readable medium having stored thereon instructions which, when executed by one or more processors, cause the one or more processors to be configured to: obtain, based on a frontal view image and via an implicit field engine in a geometry pathway, a depth map; obtain, based on the frontal view image, a masked image; generate, based on the masked image and via a semantic pathway, a reconstructed image; train, based on the depth map and the reconstructed image, a model; and finetune the model using a portion of task-specific labels to obtain a finetuned model that performs semantic view mapping on input images.

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component (s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described herein, the unsupervised representation learning framework 104 of FIG. 1 may be implemented using a neural network or multiple neural networks. The neural network can include any suitable deep network. One example includes a convolutional neural network (CNN), which includes an input layer and an output layer, with multiple hidden layers between the input and out layers. hidden layers of a CNN include a series of convolutional, nonlinear, pooling (for downsampling), and fully connected layers. The neural network can include any other deep network other than a CNN, such as an autoencoder, a deep belief nets (DBNs), a Recurrent Neural Networks (RNNs), among others.

FIG. 7 is a diagram illustrating an example of a system for implementing certain aspects of the present disclosure. In particular, FIG. 7 illustrates an example of computing system 700, which can be for example any computing device making up a computing system, a camera system, or any component thereof in which the components of the system are in communication with each other using connection 705. Connection 705 can be a physical connection using a bus, or a direct connection into processor 712, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 712. Computing system 700 can include a cache 711 of high-speed memory connected directly with, in close proximity to, or integrated as part of processor 712.

Processor 712 can include any general purpose processor and a hardware service or software service, such as services 732, 734, and 736 stored in storage device 730, configured to control processor 712 as well as a special-purpose processor where software instructions are incorporated into the actual processor design. Processor 712 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1202.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 712, it causes the system to perform a function. In some examples, a hardware service that performs a particular function can include the software component stored in a computer-readable medium in connection with the necessary hardware components, such as processor 712, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include one or more memories, one or more processors, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, engines, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus to generate a semantic map from one or more images, the apparatus comprising: one or more memories configured to store the one or more images; and one or more processors coupled to the one or more memories and configured to: generate, based on the one or more images using an implicit field engine in a geometry pathway of a machine learning model, a depth map; generate, based on the one or more images, a masked image; generate, based on the masked image using a semantic pathway of the machine learning model, a reconstructed image; train, based on the depth map and the reconstructed image, the machine learning model; and finetune the machine learning model using a portion of task-specific labels to obtain a finetuned model that performs semantic view mapping on input images.

Aspect 2. The apparatus of Aspect 1, wherein the one or more processors are configured to train the machine learning model using unsupervised representation learning.

Aspect 3. The apparatus of any one of Aspects 1 or 2, wherein the one or more processors are further configured to: generate a volumetric density of a field; and generate the depth map further based on ray casting using the volumetric density of the field.

Aspect 4. The apparatus of Aspect 3, wherein, to generate the depth map, the one or more processors are configured to: project image features for sampled points on the one or more images on a two-dimensional image plane; compute a value for each projection location of a plurality of projection locations on the two-dimensional image plane using bilinear interpolation; and process, using a multi-layer perceptron (MLP), an image feature with positional encodings based on the value.

Aspect 5. The apparatus of any one of Aspects 1 to 4, wherein the one or more processors are further configured to: generate, via a transformer, transformed-based features at a plurality of different scales; fuse the transformed-based features at the plurality of different scales to generate input data; and provide the input data to the implicit field engine to generate the depth map.

Aspect 6. The apparatus of any one of Aspects 1 to 5, wherein the one or more processors are further configured to: reconstruct, using the masked image, a non-masked image using a temporal masked auto-encoder that uses temporal consistency by randomly masking patches of the one or more images while minimizing photometric and red-green-blue losses.

Aspect 7. The apparatus of Aspect 6, wherein the one or more processors are further configured to: reconstruct at least one non-masked image for at least one corresponding future time stamp.

Aspect 8. The apparatus of Aspect 7, wherein the one or more processors are further configured to: use a current masked image to reconstruct a current time-stamped image and a future time-stamped image.

Aspect 9. The apparatus of any one of Aspects 1 to 8, wherein the task-specific labels are associated with at least one of depth estimation, semantic segmentation, instance retrieval, semantic scene segmentation tasks, 3D scene generation based on input two dimensional images, or autonomous driving.

Aspect 10. The apparatus of any one of Aspects 1 to 9, wherein the portion of the task-specific labels comprises less than 5% of the task-specific labels.

Aspect 11. The apparatus of any one of Aspects 1 to 10, wherein the semantic map is associated with generating a bird's eye view of a scene associated with the one or more images.

Aspect 12. The apparatus of any one of Aspects 1 to 11, wherein the one or more images include one or more frontal view images.

Aspect 13. The apparatus of Aspect 12, wherein a frontal view image of the one or more frontal view images comprises one of a monocular frontal view image, a temporal image, a spatial image, a 3D image, a 360 degree images, a radar data, or LiDAR data.

Aspect 14. A method of generating a semantic map from one or more images, the method comprising: generating, based on the one or more images using an implicit field engine in a geometry pathway of a machine learning model, a depth map; generating, based on the one or more images, a masked image; generating, based on the masked image using a semantic pathway of the machine learning model, a reconstructed image; training, based on the depth map and the reconstructed image, the machine learning model; and finetuning the machine learning model using a portion of task-specific labels to obtain a finetuned model that performs semantic view mapping on input images.

Aspect 15. The method of Aspect 14, further comprising training the machine learning model using unsupervised representation learning.

Aspect 16. The method of any one of Aspects 14 or 15, further comprising: generating a volumetric density of a field; and generating the depth map further based on ray casting using the volumetric density of the field.

Aspect 17. The method of Aspect 16, wherein generating the depth map comprises: projecting image features for sampled points on the one or more images on a two-dimensional image plane; computing a value for each projection location of a plurality of projection locations on the two-dimensional image plane using bilinear interpolation; and processing, using a multi-layer perceptron (MLP), an image feature with positional encodings based on the value.

Aspect 18. The method of any one of Aspects 14 to 17, further comprising: generating, via a transformer, transformed-based features at a plurality of different scales; fusing the transformed-based features at the plurality of different scales to generate input data; and providing the input data to the implicit field engine to generate the depth map.

Aspect 19. The method of any one of Aspects 14 to 18, further comprising: reconstructing, using the masked image, a non-masked image using a temporal masked auto-encoder that uses temporal consistency by randomly masking patches of the one or more images while minimizing photometric and red-green-blue losses.

Aspect 20. The method of Aspect 19, further comprising: reconstructing at least one non-masked image for at least one corresponding future time stamp.

Aspect 21. The method of any one of Aspects 14 to 20, further comprising: using a current masked image to reconstruct a current time-stamped image and a future time-stamped image.

Aspect 22. The method of any one of Aspects 14 to 21, wherein the task-specific labels are associated with at least one of depth estimation, semantic segmentation, instance retrieval, semantic scene segmentation tasks, 3D scene generation based on input two dimensional images, or autonomous driving.

Aspect 23. The method of any one of Aspects 14 to 22, wherein the portion of the task-specific labels comprises less than 5% of the task-specific labels.

Aspect 24. The method of any one of Aspects 14 to 23, wherein the semantic map is associated with generating a bird's eye view of a scene associated with the one or more images.

Aspect 25. The method of any one of Aspects 14 to 24, wherein the one or more images include one or more frontal view images.

Aspect 26. The method of Aspect 25, wherein a frontal view image of the one or more frontal view images comprises one of a monocular frontal view image, a temporal image, a spatial image, a 3D image, a 360 degree images, a radar data, or LiDAR data.

Aspect 27. An apparatus to generate a semantic map from one or more images, the apparatus comprising one or more means for performing operations according to any of Aspects 14 to 26.

Aspect 28. A non-transitory computer-readable medium having stored thereon instructions which, when executed by one or more processors, cause the one or more processors to be configured to perform operations according to any of Aspects 14 to 26.

Aspect 29. An apparatus to generate a semantic map from one or more images, the apparatus comprising: one or more memories configured to store the one or more images; and one or more processors coupled to the one or more memories and configured to: obtain, based on a frontal view image and via an implicit field engine in a geometry pathway, a depth map; obtain, based on the frontal view image, a masked image; generating, based on the masked image and via a semantic pathway, an intermediate voxel grid; generate, based on the intermediate voxel grid, one or more reconstructed images each associated with a respective future time; train a model based on the depth map, the intermediate voxel grid, and the one or more reconstructed images, each reconstructed image of the one or more reconstructed images associated with the respective future time; and obtain a finetuned model that performs semantic view mapping on input images by finetuning the model using a portion of task-specific labels.

Aspect 30. A method of generating a semantic map from one or more images, the method comprising: obtaining, based on a frontal view image and via an implicit field engine in a geometry pathway, a depth map; obtaining, based on the frontal view image, a masked image; generating, based on the masked image and via a semantic pathway, an intermediate voxel grid; generating, based on the intermediate voxel grid, one or more reconstructed images each associated with a respective future time; training a model based on the depth map, the intermediate voxel grid, and the one or more reconstructed images, each reconstructed image of the one or more reconstructed images associated with the respective future time; and obtaining a finetuned model that performs semantic view mapping on input images by finetuning the model using a portion of task-specific labels.

Aspect 31. An apparatus to generate a semantic map from one or more images, the apparatus comprising: means for obtaining, based on a frontal view image and via an implicit field engine in a geometry pathway, a depth map; means for obtaining, based on the frontal view image, a masked image; means for generating, based on the masked image and via a semantic pathway, an intermediate voxel grid; means for generating, based on the intermediate voxel grid, one or more reconstructed images each associated with a respective future time; means for training a model based on the depth map, the intermediate voxel grid, and the one or more reconstructed images, each reconstructed image of the one or more reconstructed images associated with the respective future time; and means for obtaining a finetuned model that performs semantic view mapping on input images by finetuning the model using a portion of task-specific labels.

Aspect 32. A non-transitory computer-readable medium having stored thereon instructions which, when executed by one or more processors, cause the one or more processors to be configured to: obtain, based on a frontal view image and via an implicit field engine in a geometry pathway, a depth map; obtain, based on the frontal view image, a masked image; generate, based on the masked image and via a semantic pathway, an intermediate voxel grid; generate, based on the intermediate voxel grid, one or more reconstructed images each associated with a respective future time; train a model based on the depth map, the intermediate voxel grid, and the one or more reconstructed images, each reconstructed image of the one or more reconstructed images associated with the respective future time; and finetune the model using a portion of task-specific labels to obtain a finetuned model that performs semantic view mapping on input images.

What is claimed is:

1. An apparatus to generate a semantic map from one or more images, the apparatus comprising:
   one or more memories configured to store the one or more images; and
   one or more processors coupled to the one or more memories and configured to:
      generate, based on the one or more images using an implicit field engine in a geometry pathway of a machine learning model, a depth map;
      generate, based on the one or more images, a masked image;
      generate, based on the masked image using a semantic pathway of the machine learning model, a reconstructed image;
      train, based on the depth map and the reconstructed image, the machine learning model;
      finetune the machine learning model using a portion of task-specific labels to obtain a finetuned model that performs semantic view mapping on input images; and
      reconstruct, using the masked image, a non-masked image using a temporal masked auto-encoder that uses temporal consistency by randomly masking patches of the one or more images while minimizing photometric and red-green-blue losses.

2. The apparatus of claim 1, wherein the one or more processors are configured to train the machine learning model using unsupervised representation learning.

3. The apparatus of claim 1, wherein the one or more processors are further configured to:
   generate a volumetric density of a field; and
   generate the depth map further based on ray casting using the volumetric density of the field.

4. The apparatus of claim 3, wherein, to generate the depth map, the one or more processors are configured to:
   project image features for sampled points on the one or more images on a two-dimensional image plane;
   compute a value for each projection location of a plurality of projection locations on the two-dimensional image plane using bilinear interpolation; and
   process, using a multi-layer perceptron (MLP), an image feature with positional encodings based on the value.

5. The apparatus of claim 1, wherein the one or more processors are further configured to:
   generate, via a transformer, transformed-based features at a plurality of different scales;
   fuse the transformed-based features at the plurality of different scales to generate input data; and
   provide the input data to the implicit field engine to generate the depth map.

6. The apparatus of claim 1, wherein the one or more processors are further configured to:
   reconstruct at least one non-masked image for at least one corresponding future time stamp.

7. The apparatus of claim 6, wherein the one or more processors are further configured to:
   use a current masked image to reconstruct a current time-stamped image and a future time-stamped image.

8. The apparatus of claim 1, wherein the task-specific labels are associated with at least one of depth estimation, semantic segmentation, instance retrieval, semantic scene segmentation tasks, 3D scene generation based on input two dimensional images, or autonomous driving.

9. The apparatus of claim 1, wherein the portion of the task-specific labels comprises less than 5% of the task-specific labels.

10. The apparatus of claim 1, wherein the semantic map is associated with generating a bird's eye view of a scene associated with the one or more images.

11. The apparatus of claim 1, wherein the one or more images include one or more frontal view images.

12. The apparatus of claim 11, wherein a frontal view image of the one or more frontal view images comprises one of a monocular frontal view image, a temporal image, a spatial image, a 3D image, a 360 degree images, a radar data, or LiDAR data.

13. The apparatus of claim 1, further comprising one or more cameras configured to capture the one or more images.

14. A method of generating a semantic map from one or more images, the method comprising:
   generating, based on the one or more images using an implicit field engine in a geometry pathway of a machine learning model, a depth map;
   generating, based on the one or more images, a masked image;
   generating, based on the masked image using a semantic pathway of the machine learning model, a reconstructed image;
   training, based on the depth map and the reconstructed image, the machine learning model;
   finetuning the machine learning model using a portion of task-specific labels to obtain a finetuned model that performs semantic view mapping on input images; and
   reconstructing, using the masked image, a non-masked image using a temporal masked auto-encoder that uses temporal consistency by randomly masking patches of the one or more images while minimizing photometric and red-green-blue losses.

15. The method of claim 14, further comprising training the machine learning model using unsupervised representation learning.

16. The method of claim 14, further comprising:
   generating a volumetric density of a field; and
   generating the depth map further based on ray casting using the volumetric density of the field.

17. The method of claim 14, further comprising:
   generating, via a transformer, transformed-based features at a plurality of different scales;
   fusing the transformed-based features at the plurality of different scales to generate input data; and
   providing the input data to the implicit field engine to generate the depth map.

18. A non-transitory computer-readable medium having stored thereon instructions which, when executed by one or more processors, cause the one or more processors to be configured to:
   generate, based on one or more images using an implicit field engine in a geometry pathway of a machine learning model, a depth map;

generate, based on the one or more images, a masked image;

generate, based on the masked image using a semantic pathway of the machine learning model, a reconstructed image; 5 train, based on the depth map and the reconstructed image, the machine learning model;

finetune the machine learning model using a portion of task-specific labels to obtain a finetuned model that performs semantic view mapping on input images; and 10 reconstruct, using the masked image, a non-masked image using a temporal masked auto-encoder that uses temporal consistency by randomly masking patches of the one or more images while minimizing photometric and red-green-blue losses. 15

* * * * *